US009531237B2

(12) United States Patent
Miller

(10) Patent No.: US 9,531,237 B2
(45) Date of Patent: Dec. 27, 2016

(54) DUAL RACK OUTPUT PINION DRIVE

(71) Applicant: GustoMSC Resources B.V., Schiedam (NL)

(72) Inventor: Richard W. Miller, Indianapolis, IN (US)

(73) Assignee: GustoMSC Resources B.V., Schiedam (NL)

( * ) Notice: Subject to any disclaimer, the term of this patent is extended or adjusted under 35 U.S.C. 154(b) by 6 days.

(21) Appl. No.: 14/135,442

(22) Filed: Dec. 19, 2013

(65) Prior Publication Data

US 2015/0180304 A1    Jun. 25, 2015

(51) Int. Cl.
*F16H 57/12* (2006.01)
*H02K 7/116* (2006.01)
(Continued)

(52) U.S. Cl.
CPC ........... *H02K 7/116* (2013.01); *E02B 17/0818* (2013.01); *F16H 1/28* (2013.01); *F16H 19/04* (2013.01);
(Continued)

(58) Field of Classification Search
CPC .. F16H 37/082; F16H 19/04; F16H 2001/324; F16H 1/206; F16H 55/02; F16H 2048/104; F16H 37/0833; B66B 9/022
See application file for complete search history.

(56) References Cited

U.S. PATENT DOCUMENTS 2,069,882 A    2/1937    Hall
2,666,396 A    1/1954    Kruse
(Continued)

FOREIGN PATENT DOCUMENTS

CN    101893073 A    11/2010
DE    2700174 A1    12/1977
(Continued)

OTHER PUBLICATIONS

Tsai et al., An Analytical Approach for Load Sharing Analysis of Planetary Gear Drives, 13th World Congress in Mechanism and Machine Science, Jun. 19-25, 2011, pp. 1-8, Guanajuato, Mexico.
(Continued)

*Primary Examiner* — Justin Holmes
*Assistant Examiner* — Stacey Fluhart
(74) *Attorney, Agent, or Firm* — Banner & Witcoff, Ltd.

(57) ABSTRACT

The dual output pinion rack drive includes an epicyclic gearbox which permits the division of power of a single motor to first and second spur output pinions which are subjected to slightly different loading conditions based on rack geometry, rack tolerances and gear tolerances. A motor drives an input sun gear which drives planet gears which drive large and small ring gears in opposite rotational directions at similar torque levels while the carrier floats rotationally. None of the gearbox components, the sun gear, the planet gears, the large ring gear, the small ring gear, the planet carrier, and the housing are fixed rotationally. Each ring gear couples to first and second spur output pinions, respectively, and power is transferred through intermediate gear reductions and final planetary gear systems to first and second rack driving output pinions rotating in opposite directions driving the platform up a central rack.

10 Claims, 25 Drawing Sheets

(51) Int. Cl.
*F16H 1/28* (2006.01)
*F16H 19/04* (2006.01)
*E02B 17/08* (2006.01)

(52) U.S. Cl.
CPC ......... *F16H 57/12* (2013.01); *F16H 2057/121* (2013.01)

(56) References Cited

U.S. PATENT DOCUMENTS

| | | | |
|---|---|---|---|
| 2,696,125 A | 12/1954 | Saari | |
| 2,954,704 A | 10/1960 | Saari | |
| 3,016,989 A | 1/1962 | Lindmark | |
| 3,237,483 A | 3/1966 | Kelley et al. | |
| 3,313,376 A | 4/1967 | Holland, Sr. | |
| 3,415,343 A | 12/1968 | Svensson | |
| 3,686,978 A | 8/1972 | Knoblach et al. | |
| 3,737,000 A | 6/1973 | Knoblach et al. | |
| 3,743,247 A | 7/1973 | Willke et al. | |
| 3,924,710 A | 12/1975 | Shohet | |
| 4,022,429 A | 5/1977 | Yonekura | |
| RE29,539 E | 2/1978 | Willke et al. | |
| 4,092,878 A | 6/1978 | Campbell | |
| 4,116,085 A | 9/1978 | Bishop | |
| 4,116,251 A | 9/1978 | Graney | |
| 4,160,538 A | 7/1979 | Armstrong | |
| 4,190,135 A | 2/1980 | Wenzel et al. | |
| 4,203,576 A | 5/1980 | Sutton | |
| 4,229,991 A | 10/1980 | Douglas et al. | |
| 4,269,392 A | 5/1981 | Andersen | |
| 4,269,543 A | 5/1981 | Goldman et al. | |
| 4,279,553 A | 7/1981 | Cleary | |
| 4,292,732 A | 10/1981 | Tucci | |
| 4,293,054 A | 10/1981 | Pieri | |
| 4,354,375 A | 10/1982 | Lesowsky | |
| 4,356,973 A | 11/1982 | Lawson | |
| 4,386,757 A | 6/1983 | Vezole | |
| 4,387,881 A | 6/1983 | McDuffie | |
| 4,430,902 A | 2/1984 | McClure | |
| 4,431,343 A | 2/1984 | Uchiyama et al. | |
| 4,443,000 A | 4/1984 | Harvard | |
| 4,453,858 A | 6/1984 | Guiader | |
| 4,456,224 A | 6/1984 | Havard | |
| 4,478,102 A | 10/1984 | Ackermann et al. | |
| 4,482,272 A | 11/1984 | Colin | |
| 4,497,591 A | 2/1985 | Gillis | |
| 4,512,553 A | 4/1985 | Dunham et al. | |
| 4,516,663 A | 5/1985 | Dalessio et al. | |
| 4,602,521 A | 7/1986 | Bishop et al. | |
| 4,638,676 A | 1/1987 | Lively et al. | |
| 4,655,640 A | 4/1987 | Gillis | |
| 4,658,664 A | 4/1987 | Jacobs et al. | |
| 4,662,787 A | 5/1987 | Tatsuguchi | |
| 4,674,350 A | 6/1987 | Zaunberger et al. | |
| 4,678,165 A | 7/1987 | Eloranta | |
| RE32,589 E | 2/1988 | Goldman et al. | |
| 4,791,832 A | 12/1988 | McCaw | |
| 4,792,121 A | 12/1988 | Annas, Sr. et al. | |
| 4,809,814 A | 3/1989 | St-Germain | |
| 4,811,930 A | 3/1989 | Riedl | |
| 4,813,814 A | 3/1989 | Shibuta et al. | |
| 4,830,337 A | 5/1989 | Ichiro et al. | |
| 4,885,698 A | 12/1989 | Kawasaki | |
| 4,901,982 A | 2/1990 | Havard et al. | |
| 4,967,733 A | 11/1990 | Rousseau | |
| 5,020,777 A | 6/1991 | Yocum | |
| 5,125,290 A | 6/1992 | Cotter | |
| 5,139,366 A | 8/1992 | Choate et al. | |
| 5,161,424 A | 11/1992 | Saberton et al. | |
| 5,170,994 A | 12/1992 | Riedl et al. | |
| 5,183,236 A | 2/1993 | Droulon | |
| 5,233,389 A | 8/1993 | Deguchi et al. | |
| 5,406,859 A | 4/1995 | Belford | |
| 5,415,595 A * | 5/1995 | Nelson | 475/7 |
| 5,595,251 A | 1/1997 | Cook, Jr. | |
| 5,711,736 A * | 1/1998 | Kyodo | 475/149 |
| 5,728,022 A * | 3/1998 | Schultz | 475/205 |
| 5,797,703 A | 8/1998 | Delamatyr | |
| 5,906,457 A | 5/1999 | Choate et al. | |
| 5,915,882 A | 6/1999 | Darwiche et al. | |
| 5,941,124 A | 8/1999 | Tan | |
| 6,039,508 A | 3/2000 | White | |
| 6,076,996 A | 6/2000 | Choate et al. | |
| 6,206,345 B1 | 3/2001 | Lenahan et al. | |
| 6,224,037 B1 | 5/2001 | Novick | |
| 6,231,269 B1 | 5/2001 | Shear et al. | |
| 6,325,738 B1 | 12/2001 | Caringella et al. | |
| 6,386,060 B1 | 5/2002 | Epshteyn | |
| 6,431,795 B2 | 8/2002 | White | |
| 6,523,647 B2 | 2/2003 | Duplessis | |
| 6,543,305 B1 | 4/2003 | Van Cor | |
| 6,581,910 B1 | 6/2003 | Granata | |
| 6,588,293 B2 | 7/2003 | Tsubouchi et al. | |
| 6,595,077 B1 | 7/2003 | Geiberger et al. | |
| 6,599,217 B2 | 7/2003 | Caringella et al. | |
| 6,634,979 B1 | 10/2003 | Quaife | |
| 6,652,194 B2 | 11/2003 | Ingle | |
| 6,689,252 B1 | 2/2004 | Shamouilian et al. | |
| 6,705,802 B2 | 3/2004 | Radwan | |
| 6,851,327 B2 | 2/2005 | Lee | |
| 6,912,786 B2 | 7/2005 | Jinkins et al. | |
| 6,981,483 B1 | 1/2006 | Keip | |
| 6,981,822 B2 | 1/2006 | Ingle | |
| 6,997,076 B2 | 2/2006 | Menjak et al. | |
| 7,011,471 B2 | 3/2006 | Ingle | |
| 7,222,550 B2 | 5/2007 | Siraky et al. | |
| 7,258,313 B2 | 8/2007 | Gabriel | |
| 7,258,510 B2 | 8/2007 | Kawasaki | |
| 7,334,642 B2 | 2/2008 | Doering et al. | |
| 7,581,463 B2 | 9/2009 | Jacobs et al. | |
| 7,581,714 B2 | 9/2009 | Machu | |
| 7,677,131 B2 | 3/2010 | Chapelain et al. | |
| 7,814,809 B2 | 10/2010 | Shinohara | |
| 7,930,951 B2 | 4/2011 | Eickholt | |
| 7,980,152 B2 | 7/2011 | Arlt | |
| 8,015,900 B2 | 9/2011 | Gmirya | |
| 8,069,954 B2 | 12/2011 | Kempf | |
| 8,104,368 B2 | 1/2012 | Aaron | |
| 8,113,125 B2 | 2/2012 | Hepner et al. | |
| 8,113,742 B2 | 2/2012 | Kaarstad | |
| 8,133,146 B2 | 3/2012 | Radzevich et al. | |
| 8,216,108 B2 * | 7/2012 | Montestruc | 475/346 |
| 8,276,474 B2 | 10/2012 | Kim et al. | |
| 2002/0152825 A1 | 10/2002 | Adams et al. | |
| 2004/0221670 A1 | 11/2004 | Becker et al. | |
| 2005/0009661 A1 | 1/2005 | Kerr | |
| 2005/0063787 A1 | 3/2005 | Ingle | |
| 2005/0181905 A1 | 8/2005 | Ali et al. | |
| 2005/0260040 A1 | 11/2005 | Ingle et al. | |
| 2007/0138451 A1 | 6/2007 | Hsu | |
| 2007/0295136 A1 | 12/2007 | Fleming | |
| 2008/0116427 A1 | 5/2008 | Machu | |
| 2008/0210915 A1 | 9/2008 | Ruan | |
| 2008/0223163 A1 | 9/2008 | Yamazaki et al. | |
| 2010/0064834 A1 | 3/2010 | Takeuchi et al. | |
| 2010/0132495 A1 | 6/2010 | Bernier | |
| 2010/0144484 A1 | 6/2010 | Bawks | |
| 2010/0261568 A1 | 10/2010 | Radzevich et al. | |
| 2011/0253953 A1 | 10/2011 | Tanaka | |
| 2011/0262182 A1 | 10/2011 | Awano | |
| 2012/0181490 A1 | 7/2012 | Guyard | |
| 2014/0208894 A1 | 7/2014 | Miller | |

FOREIGN PATENT DOCUMENTS

| | | |
|---|---|---|
| DE | 102004007449 A1 | 9/2005 |
| EP | 1128974 B1 | 9/2005 |
| WO | 2014025261 A1 | 2/2014 |

OTHER PUBLICATIONS

Amendola, Advantages of an Epicyclic Gear, Tech. Document, Artec Machine Systems, Jun. 2012, p. 1, North Branford, Connecticut.

(56) References Cited

OTHER PUBLICATIONS

Spur Gear Terms and Concepts, Gears Educational Systems LLC, www.gearseds.com, Hanover Massachusetts, pp. 1-19.
Rey, Dr. Gonzalo Gonzalez, Higher Contact Ratios for Quieter Gears, gearsolutions.com, pp. 20-27, Jan. 2009.
Basics of Mechanisms, Chapter One, pp. 1-20.
Obsieger, B., The Special Toothing for Rack and Pinion of Jacking System on Offshore Platforms, Advanced Engineering, 4(2010), ISSN 1846-5900, Edu-Point, pp. 45-54.
Goldfarb et al., An Advanced Approach to Optimal Gear Design, Gear Solutions, gearsolutionsonline.com, Aug. 2008, pp. 40-51.
Zhang et al, Introduction to Mechanisms, Rapid Design Through Virtual and Physical Prototyping, Chapter 7 Gears, Carnegie Mellon University, pp. 1-12.
Simionescu, AC 2008-1325: Interactive Involute Gear Analysis and Tooth Profile Generation Using Working Model 2D, American Society for Engineering Education, 2008, pp. 1-13.
Involute Gear Equations, UTS Gear Design and Manufacturing Software, UTS Software, pp. 1-5.
The ABC's of Gears, Basic Guide-B, Kohara Gear Industry Co. Ltd., Sep. 1, 2007, pp. 1-40.
Walton, Gear Manual, Martin Sprocket & Gear, Inc,. pp. 1-62, 1999.
Gears—General Gearing Arrangements, Design Aerospace LLC, www.daerospace.com/mechanicalsystems/gearsgen.php, 2010, pp. 1-11.
Kapelevich et al, Thermotech Company, Introduction to Direct Gear Design, pp. 1-15.
Anderson et al, Efficiency of Nonstandard and High Contact Ratio Involute Spur Gears, NASA Technical Memorandum 83725, USAAVSCOM Technical Report 84-C-9, pp. 1-35, Oct. 1984.
Mauer, L., The New Powerful Gearwheel Module, Intec GMBH Wessling, Simpack Usermeeting 2006, Baden-Baden, Mar. 21-22, 2006.
Gears, Gears.Doc., Fairfield University, 1073 North Benson Road, Fairfield, Connecticut 06824, 2005, ME312.
EPI Inc., Gear Design—Geometry, Power Ratings, Dynamic Loads, Fatigue, www.epi-eng.com, Nov. 28, 2012, pp. 1-5.
International Search Report—PCT/NL2014/050883—Dated May 13, 2015.

* cited by examiner

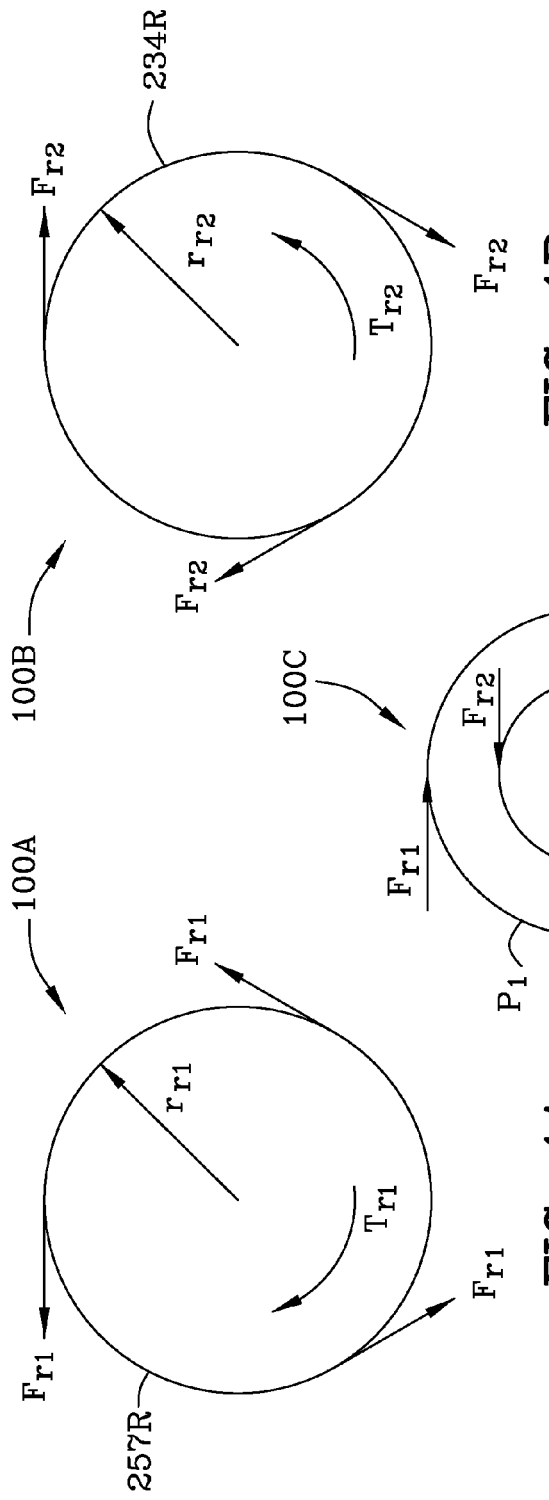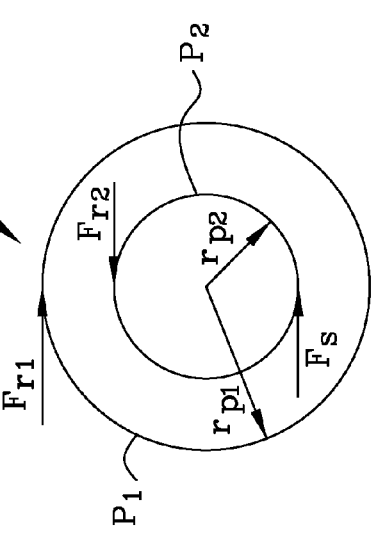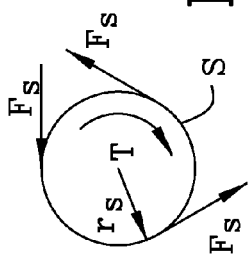
FIG. 1A  FIG. 1B  FIG. 1C  FIG. 1D

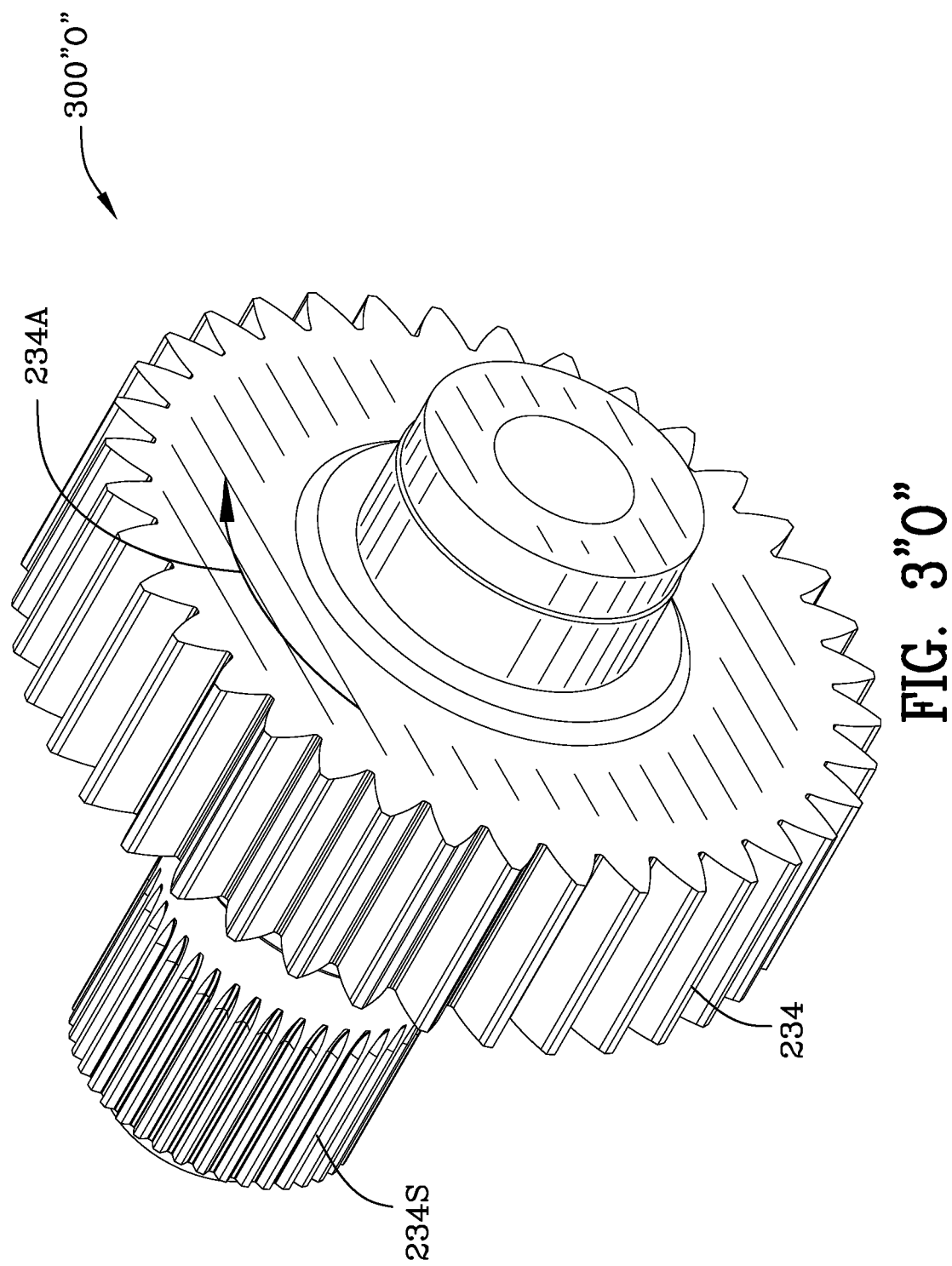
FIG. 3"O"

DUAL RACK OUTPUT PINION DRIVE

FIELD OF THE INVENTION

The invention is in the field of torque sharing drives which raise and lower platforms including oil platforms.

BACKGROUND OF THE INVENTION

Oil rig platforms and the like are well known in the art. These platforms are commonly used during construction of the oil rig and to support workers and equipment at desired elevations. Platforms are necessarily moved upward and downward and these platforms are known as elevating platform assemblies. It is necessary to lift and lower large loads on oil rig platforms and the like. It is necessary to quickly change the elevation of workers and equipment and thus, elevating platform assemblies are advantageous. Accordingly, jacking drives are securely attached to the platform along with a motor to power the jacking drives thus raising and lowering the platform to the desired elevation.

U.S. patent application Ser. No. 13/750,781, entitled: Torque Sharing Drive And Torque Sharing Process, filed Jan. 25, 2013, in the abstract thereof, states: "A torque sharing drive and process for sharing torque accommodates tooth inaccuracies on the rack and outer pinions. A driving pinion mates with first and second gears. The driving pinion is radially, bidirectionally, movable in response to gear separation forces only along the line between the centers of the driving pinion, the first gear and the second gear. First and second outer pinions are rotatable with the first and second gears, and as the driving pinion moves radially toward the first or second gear in response to gear separation forces, the first or second gear is angularly and rotationally advanced with respect to the other gear accommodating inaccuracies in the teeth of the rack and outer pinions. Alternatively, when gear separation forces are balanced, the driving pinion resides approximately equidistantly intermediate the first and second gear and the first and second outer pinions are approximately in phase."

United States Patent Publication No. US 2007/0295136 A1 states, in the abstract: "[a]n anti-backlash system comprising a single drive pinion and motor is disclosed. In an exemplary embodiment, the single drive pinion is situated between two idler gears and is allowed to move in the radial direction relative to the bull gear. A preload force provides for the substantial absence of backlash at low torque loads. The pinion moves to the center point between the two idler gears and balances the torque during high torque loads. The present anti-backlash system is well suited for use in drive and positioning systems that are subject to variable and reversing loads, such as those experienced by radio telescopes in variable wind conditions."

European Patent EP 1 128 974 B1 states, in claim 1, thereof: "Nile invention relates to a portal drive for a portal axle featuring a drive pinion (1), which is axially supported via two bilaterally arranged axial bearings (4, 5), with the drive pinion driving an output pinion (3) via intermediate gears (2), with which it meshes, characterized in that each of the two axial bearings (4, 5) is pre loaded in axial direction by a spring element (7) so that the drive pinion (1) is floating mounted within the kinetic range of the spring elements (7)."

U.S. Pat. No. 5,595,251, states, in the abstract: "[m]ethods and apparatus are provided for a torque driver including a displaceable gear to limit torque transfer to a fastener at a precisely controlled torque limit. A biasing assembly biases a first gear into engagement with a second gear for torque transfer between the first and second gear. The biasing assembly includes a pressurized cylinder controlled at a constant pressure that corresponds to a torque limit. A calibrated gage and valve is used to set the desired torque limit. One or more coiled output linkages connect the first gear with the fastener adaptor which may be a socket for a nut. A gear tooth profile provides a separation force that overcomes the bias to limit torque at the desired torque limit. Multiple fasteners may be rotated simultaneously to a desired torque limit if additional output spur gears are provided. The torque limit is adjustable and may be different for fasteners within the same fastener configuration."

Variations may occur in the teeth of the rack and the teeth of the pinion which drives the rack. Variations may occur in the assembly of the torque sharing drive. Variations may occur in the alignment and mounting of the torque sharing drive. Variations include dimensional variations and inaccuracies. The dimensional variations may affect: tooth surfaces including flank surfaces, circular tooth thicknesses, circular pitch lengths, and tooth spaces. Inaccuracies include gear tooth spacing or index variation between teeth. Additionally, there may also be inaccuracies in the torque sharing drive assembly mounting and spacing between components thereof.

Individual quality level attributes include the following: involute variation, and, gear tooth spacing/pitch variation. In addition, there are various composite variations, which represent a combination of these individual variations, and more closely represent what actual pinion teeth would present to its mating rack. The rack will have similar variations inherent to its manufacture and quality level. In addition to these dimensional variations inherent in each individual part (pinion and rack), there are mounting and alignment variations inherent in the structure that the rack and pinion (torque sharing drive) mount to. The combined effect of these variations (individual, composite and mounting) can be significant. These variations impact operation of the rack and pinion and affect smooth, completely consistent and conjugate action of the rack and pinion. This is normal and expected for any rack and pinion design. Dimensional variations in the teeth of the rack may occur. The aforementioned variations are set forth by way of example only and other variations in the drive may occur.

SUMMARY OF THE INVENTION

There are no components of the planetary epicyclic gearbox fixed against rotation in the planetary epicyclic gearbox. The planetary epicyclic gearbox may be referred to herein as a differential planetary epicyclic gearbox. The two outputs of the differential planetary epicyclic gearbox are rotating in opposite directions and the actual speed ratio of the differential planetary epicyclic gearbox is twice what it would be with one component fixed against rotation. A standard planetary has either a fixed ring gear or fixed carrier, and an overall speed ratio. If we allow both the ring gear and carrier to rotate in opposite directions relative to each other, the speed ratio of the one output member relative to the other output member is doubled, because of the opposite directions of rotation. The torque relationship between the various components of the differential planetary epicyclic gearbox remains the same.

The differential planetary epicyclic gearbox (just referred to herein as the "epicyclic gearbox") permits the division of power of a single bidirectional motor and provides two output pinions which are subjected to slightly different loading conditions based on rack geometry and/or tolerances. Load sharing and close to equal load sharing is an important attribute of this invention. The invention provides two power paths.

The invention allows one power path of the two power paths to either advance or retard relative to the other power path, so that load sharing occurs between the two rack path. Both rack driving output pinions are thus always in mesh with their respective racks, and driving their respective racks with close to equal torque.

Most differentiating/load sharing drives provide a feedback loop and the remainder of the gears in the respective gear train respond to the feedback loop. Having the differential or member doing the differentiating and load sharing at or close to the input of the gear train is important. This arrangement and structure allows for smaller components in the epicyclic gearbox serving the differentiating purpose because the torque is much less there. Having only one differentiating member is also an advantage.

In one example of the invention, a high-torque, low-speed motor drives an input sun gear of the centrally mounted epicyclic gearbox. The motor does not necessarily have to be a high-torque, low-speed motor. Any type of motor may be used. There are no fixed components in the centrally mounted epicyclic gearbox. In other words, there are no components affixed against rotation. For instance, the large and small ring gears, carrier, and housing are not fixed against rotation. Large diameter and small diameter ring gears rotate in opposite directions at similar torque levels while the carrier floats rotationally. The large diameter ring gear will be described hereinafter as the large ring gear. The small diameter ring gear will be described hereinafter as the small ring gear. Each ring gear couples to a spur output pinion, and power is transferred through two simple spur gear reductions and through a final planetary gear system to the rack driving output pinion. Each ring gear could couple to another type of gear other than a spur output pinion, for instance, without limitation, a helical output pinion. Rack driving output pinions are rotating in opposite directions driving the epicyclic gearbox and platform (to which the epicyclic gearbox is mounted) up a central rack.

Alternatively, in another example of the invention, the rack driving output pinions may be located on the same side of the rack and operate in the same direction.

In yet another example of the invention, a dual output pinion rack drive is disclosed and claimed. The dual output pinion rack drive includes a rack. The rack includes a central portion, a first side and a second side. The central portion is preferably cylindrically shaped. The first side of the rack includes first teeth and the second side of the rack includes second teeth. A high torque, low-speed motor is used with an epicyclic gearbox. The motor does not necessarily have to be a high-torque, low-speed motor. Any type of motor may be used and it may be an electric motor or a hydraulic motor. The epicyclic gearbox includes: a first spur output pinion, a connection plate, and a small ring gear. The first spur output pinion, the connection plate, and the small ring gear are affixed together and rotatable together. The epicyclic gearbox also includes a second spur output pinion, a large ring gear, and an end plate. The second spur output pinion, the large ring gear and the end plate are affixed together and rotatable together. An input shaft is driven by the high torque, low-speed motor. A sun gear is affixed to the input shaft. A floating carrier is employed. A first planet gear and a second planet gear are concentric with each other. The first planet gear and the second planet gear are integral with each other such that the first planet gear and the second planet gear are rotatable together. In other words, the first planet gear and the second planet gear are cluster gears. A planet pin is fixedly mounted with respect to the floating carrier. Preferably there are three planet pins affixed to the floating carrier which is free to rotate. Preferably there are three cluster gears having a first planet gear and a second planet gear that are integral with one another.

The first planet gear and the second planet gear are rotatably mounted on the planet pin.

The first planet gear engages the large ring gear driving the large ring gear and the first spur output pinion in a first rotation direction. The second planet gear engages the small ring gear driving the small ring gear and the second spur output pinion in a second rotation direction. None of the floating carrier, the sun gear, the input shaft, the second spur output pinion, the large ring gear, the end plate, the first spur output pinion, the connection plate and the small ring gear are fixed rotationally.

The first spur output pinion drives a first compound intermediate gear set. The first compound intermediate gear set drives a first final output planetary gear system. The first final output planetary gear system includes a first final output planetary gear system carrier. The first output planetary gear system carrier of the first planetary gear system drives a first rack driving output pinion. The first rack driving output pinion includes teeth. The teeth of the first rack driving output pinion engage the first teeth of the first side of the rack.

The second spur output pinion drives a second compound intermediate gear set. The second compound intermediate gear set drives a second final output planetary gear system. The second final output planetary gear system includes a second final output planetary gear system carrier. The second output planetary gear system carrier of the second planetary gear system drives a second rack driving output pinion. The second rack driving output pinion includes teeth. The teeth of the second rack driving output pinion engage the second teeth of the second side of the rack.

One of the first spur output pinion and the second spur output pinion is out of phase with respect to the other due to variations in rack geometry. Alternatively, one of the first spur output pinion and the second spur output pinion is out of phase with respect to the other due to variations in the first spur output pinion, the second spur output pinion, the small ring gear, the large ring gear, the first planet gear and the second planet gear.

Still alternatively, one of the first spur output pinion and the second spur output pinion is out of phase with respect to the other due to variations in: a first compound intermediate gear set, a first final output planetary gear system, a first final output planetary gear system carrier, the teeth of the first rack driving output pinion, and the first teeth of the first side of the rack; and, a second compound intermediate gear set, a second final output planetary gear system, a second final output planetary gear system carrier, the teeth of the second rack driving output pinion, and the second teeth of the second side of the rack. Further, the relative position of the first teeth of the first side of the rack and the second teeth of the second side of the rack may be such that the first spur output pinion and the second spur output pinion operate out of phase with respect to each other.

Further, the dual output pinion rack drive is disclosed and claimed wherein it is mounted to a platform and wherein the same features are disclosed and claimed.

In yet another example of the invention, a dual output pinion rack drive is mounted to a platform. A rack includes a central portion, a first side and a second side. The first side of the rack includes first teeth and the second side of the rack includes second teeth. A motor drives the epicyclic gearbox load sharing means. A feedback loop means controls the load sharing means. The first rack driving output pinion and the second rack driving output pinion are driven by the epicyclic gearbox load sharing means.

The epicyclic gearbox load sharing means includes a first spur output pinion, a large ring gear, and an end plate. The first spur output pinion, the large ring gear and the end plate are affixed together and are rotatable together. A second spur output pinion, said connection plate, and said small ring gear affixed together and rotatable together. An input shaft is driven by the motor. A sun gear is affixed to the input shaft. A floating carrier and a cluster gear includes a first planet gear and a second planet gear. The first planet gear and the second planet gear are concentric and integral with each other. In other words the first planet gear and the second planet gear are made from one piece. The first planet gear and the second planet gear being integral with each other such that the first planet gear and the second planet gear are rotatable together. A planet pin is affixed to said floating carrier. The first planet gear and the second planet gear are rotatably mounted on said planet pin. The first planet gear engages the large ring gear driving the large ring gear and the first spur output pinion in a first rotational direction. The second planet gear engages the small ring gear driving the small ring gear and the second spur output pinion in a second rotational direction. None of the floating carrier, the sun gear, the input shaft, the second spur output pinion, the large ring gear and the end plate, the first spur output pinion, the connection plate and the small ring gear being fixed rotationally.

It is an object of the present invention to provide an epicyclic gearbox which divides input motor power between first and second spur output pinions of the epicyclic gearbox which are subjected to slightly different loading conditions based on rack geometry, rack tolerances and gear tolerances.

It is an object of the present invention to provide epicyclic gearbox load sharing means.

It is an object of the present invention to provide a feedback loop means for controlling epicyclic load sharing means.

It is an object of the present invention to provide an epicyclic gearbox which provides load sharing between a first drive and a second drive.

It is an object of the present invention to provide an epicyclic gearbox driven by a high-torque, low-speed motor.

It is an object of the present invention to provide an epicyclic gearbox driven by a bidirectional high-torque, low-speed motor.

It is an object of the present invention to provide an epicyclic gearbox driven by a bidirectional electric or hydraulic motor.

It is an object of the present invention to provide an epicyclic gearbox having no rotationally fixed components which divides input motor power between first and second spur output pinions of the epicyclic gearbox which are subjected to slightly different loading conditions based on rack geometry, rack tolerances and gear tolerances.

It is an object of the present invention to provide a centrally mounted epicyclic gearbox wherein the sun gear, planets, small ring gear, large ring gear, planet carrier, housing, first spur output pinion, and second spur output pinion are not fixed rotationally.

It is an object of the present invention to provide a dual output pinion rack drive which is mounted to a platform and wherein the same features are disclosed and claimed.

It is an object of the present invention to provide an epicyclic gearbox having large and small ring gears which rotate in opposite directions at similar torque levels while the carrier floats.

It is an object of the present invention to provide an epicyclic gearbox having a large ring gear affixed to the first spur output pinion and a small ring gear integral with or affixed to the second spur output pinion.

It is an object of the present invention to provide an epicyclic gearbox which provides a first spur output pinion and a second spur output pinion output which rotate in opposite directions at similar torque levels while the carrier floats.

It is an object of the present invention to provide an epicyclic gearbox wherein one of the first spur output pinion and the second spur output pinion is out of phase with respect to the other due to variations in rack geometry.

It is an object of the present invention to provide an epicyclic gearbox wherein one of the first spur output pinion and the second spur output pinion is out of phase with respect to the other due to variations in the first spur output pinion, the second spur output pinion, the small ring gear, the large ring gear, the first planet gear and the second planet gear.

It is an object of the present invention to provide an epicyclic gearbox wherein the first spur output pinion and the second spur output pinion are out of phase with respect to the other due to variations in: a first compound intermediate gear set, a first final output planetary gear system, a first final output planetary gear system carrier, the teeth of the first rack driving output pinion, and the first teeth of the first side of the rack; and, a second compound intermediate gear set, a second final output planetary gear system, a second final output planetary gear system carrier, the teeth of the second rack driving output pinion, and the second teeth of the second side of the rack.

It is an object of the present invention to provide a dual output pinion rack drive rotating in opposite directions, driving the gearbox and platform up two central racks.

It is an object of the present invention to provide large and small ring gears rotating in opposite directions, driving the gearbox and platform up two central racks.

BRIEF DESCRIPTION OF THE DRAWINGS

FIG. 1A is a schematic free body diagram of the first ring gear stage.

FIG. 1B is a schematic free body diagram of the second ring gear stage.

FIG. 1C is a schematic free body diagram of the planet gears.

FIG. 1D is schematic free body diagram of the sun gear.

FIG. 3O is a perspective view of the second spur output pinion and spline connection.

Figure 2:
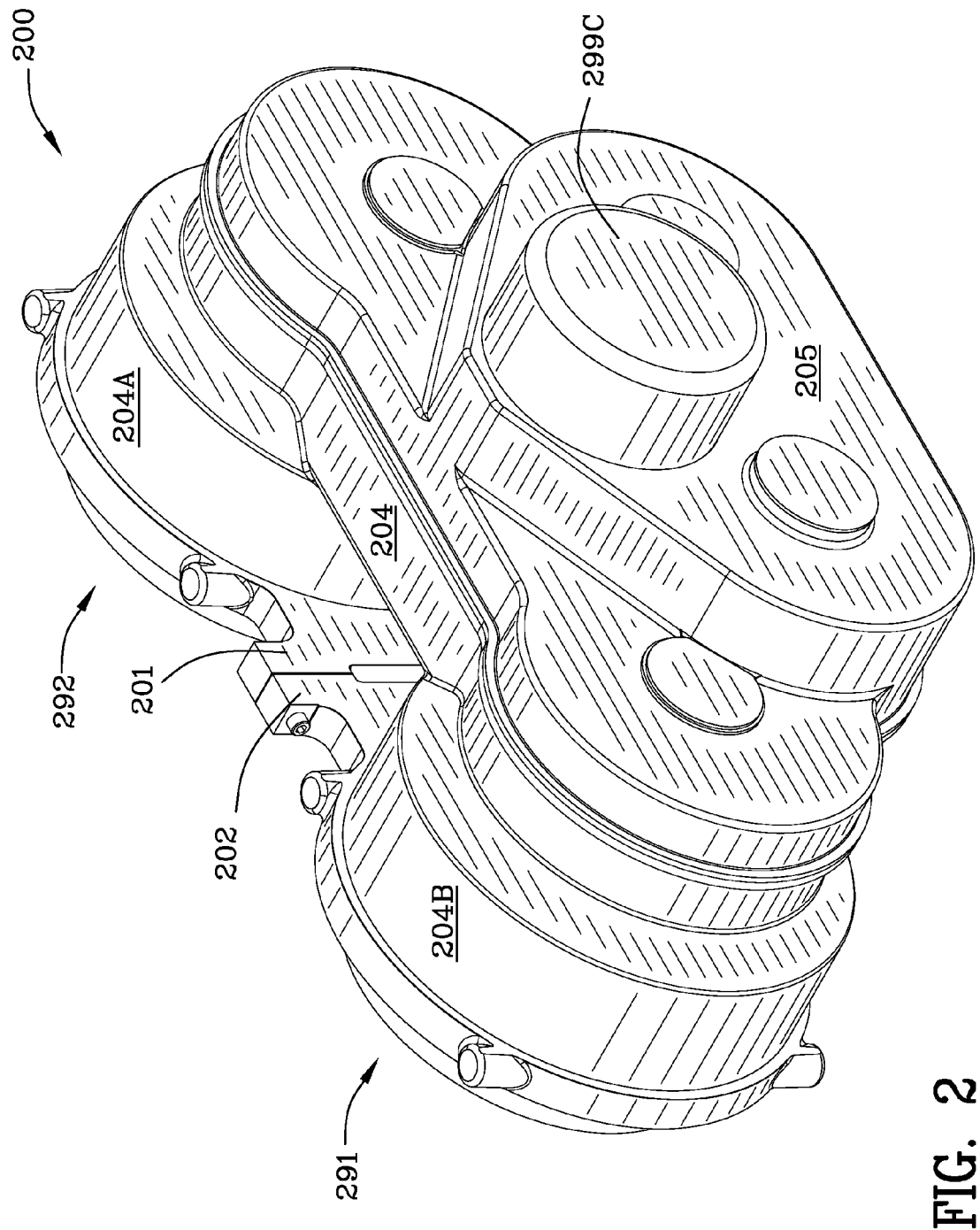
FIG. 2 is a perspective view of the dual output pinion rack drive.

The drawing figures will be best understood when reference is made to the description of the invention and claims which follow hereinbelow.

DESCRIPTION OF THE INVENTION

The dual output pinion rack drive 291, 292 includes an epicyclic gearbox 220 which permits the division of power of a single motor 299M and provides first and second spur output pinions 257, 234 which are subjected to slightly different loading conditions based on rack 276R geometry and tolerances, rack teeth 276T, 277T geometry and tolerances, and gear tolerances. Referring to FIG. 3A, a high-torque, low-speed motor 299M drives an input sun gear, S, which, in turn, drives cluster planet gears $P_1$, $P_2$, which drive large 257R and small 234R ring gears in opposite rotational directions at similar torque levels while the carrier 220C floats. By "floats" it is meant that the carrier is not rotationally restrained. Any type of motor may be used. None of the gearbox components, the sun gear, the planet gears, the large ring gear, the small ring gear, the planet carrier 220C, and the housing are fixed against rotation. The end plate 257E is considered a housing. Each ring gear couples to a first 257 and second 234 spur output pinion, respectively, and power is transferred through intermediate compound two-stage gear reductions and final planetary gear systems to first 275G and second 274G rack driving output pinions rotating in opposite directions driving the platform up two central racks.

FIG. 1A is a schematic free body diagram 100A of the first or large ring gear 257R. FIG. 1B is a schematic free body diagram 100B of the second or small ring gear 234R. FIG. 1C is a schematic free body diagram 100C of the cluster planet gears, $P_1$, $P_2$. FIG. 1D is schematic free body diagram 100D of the sun gear, S.

Figure 3:
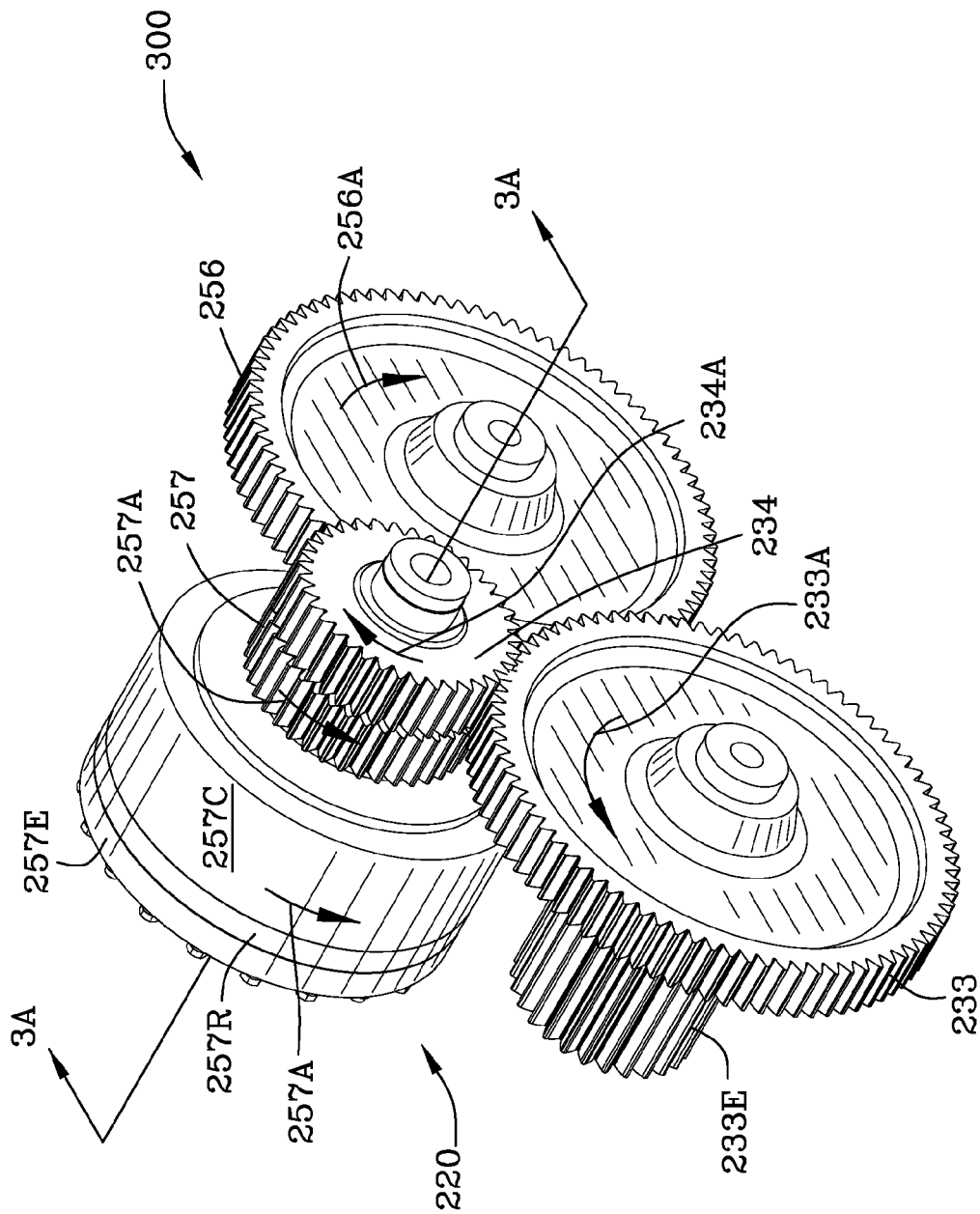
FIG. 3 is a perspective view of the epicyclic gearbox (torque splitting transmission), spur output pinions, and intermediate gears.
Figure 3A:
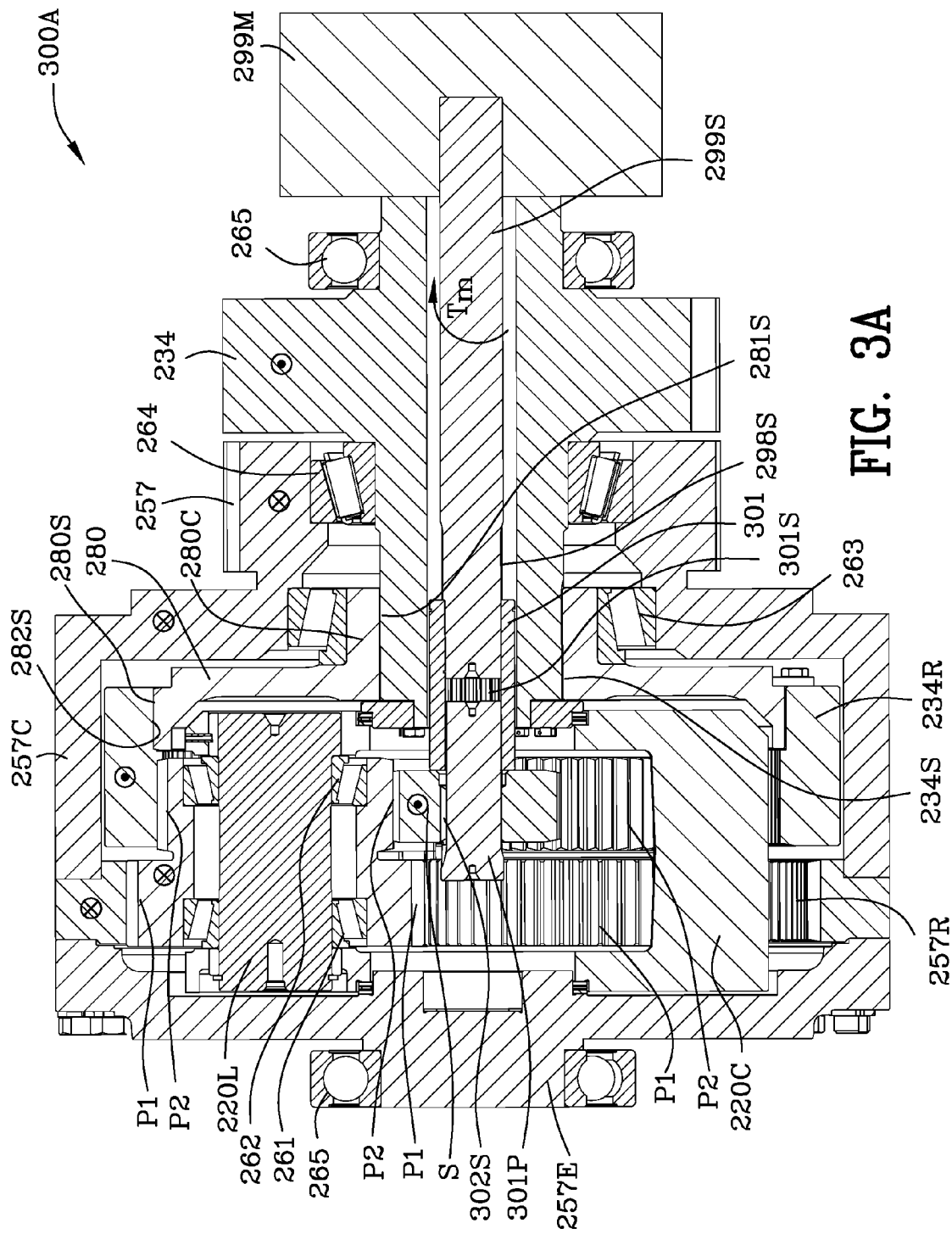
FIG. 3A is a cross-sectional view of the epicyclic gearbox (torque splitting transmission) and spur output pinions taken along the lines 3A-3A of FIG. 3.
Figure 3B:
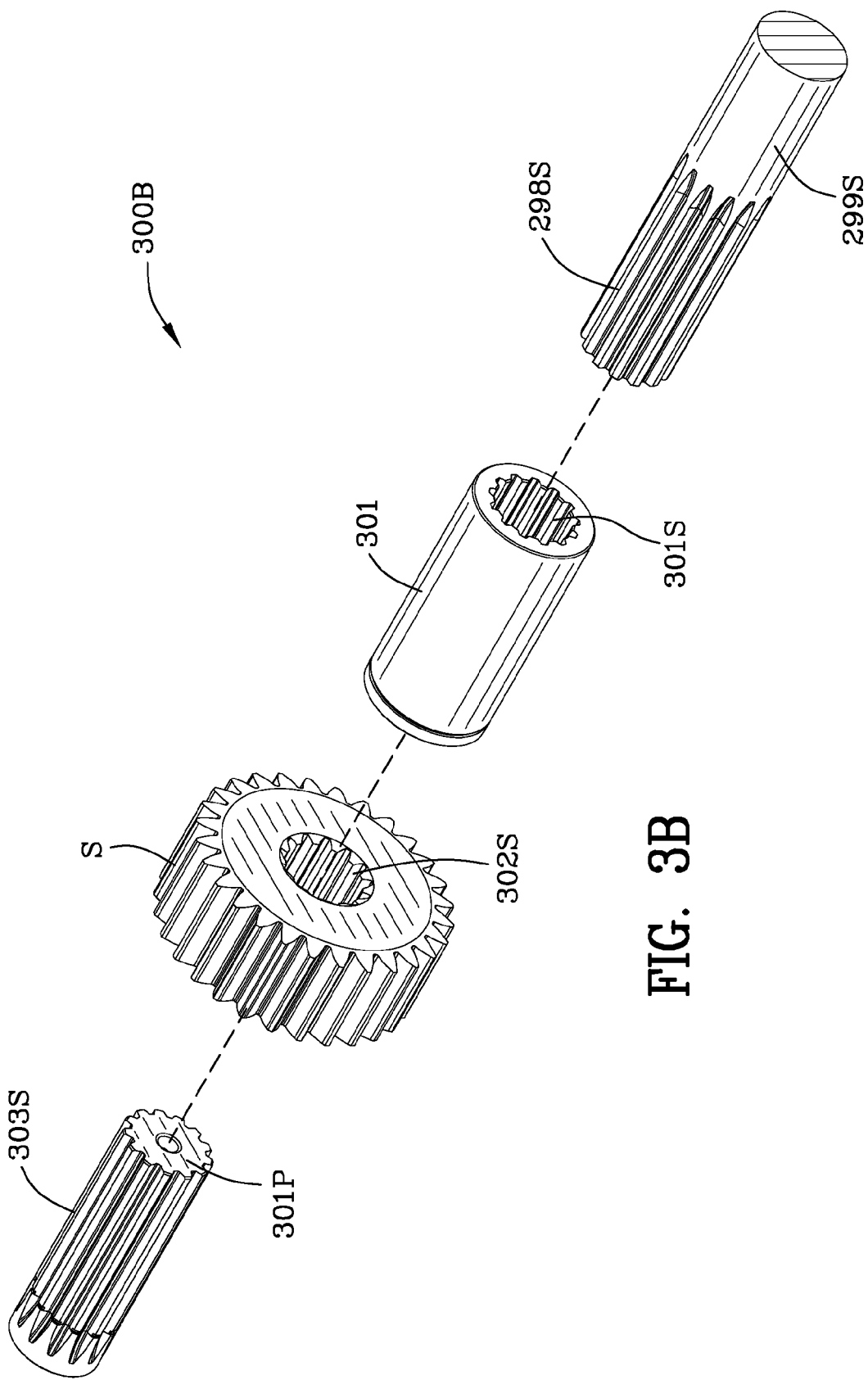
FIG. 3B is a perspective view of the motor shaft, the sleeve, the pin and the sun of the epicyclic gearbox (torque splitting transmission).

FIG. 3 is a perspective view 300A of the epicyclic gearbox (torque splitting transmission) 220, first 257 and second 234 spur output pinions and intermediate gears 233, 233E and 256. Arrow 256A indicates the direction of rotation of intermediate drive gear 256. Intermediate gear 256E is affixed to intermediate gear 256 and rotates therewith but is not illustrated in FIG. 3. FIG. 3A is a cross-sectional view of the epicyclic gearbox (torque splitting transmission) 220 and spur output pinions 257, 234 taken along the lines 3A-3A of FIG. 3. FIG. 3B is a perspective view 300B of the motor shaft 299S, the sleeve 301, the pin 301P, and the sun, S, of the epicyclic gearbox (torque splitting transmission) 220. Spur output pinions 257, 234 are referred to hereinabove, and it will be understood by those skilled in the art that the outputs can be helical gears or some other type of gear.

The following equations are by way of example only and are related to the exemplary schematic free body diagrams of FIGS. 1A, 1B, 1C and 1D.

In regard to the cluster planet gears, $P_1$, $P_2$, of the epicyclic gearbox (torque splitting transmission) 220, the following equations are obtained:

$$\Sigma F_x = 0 \text{ then } F_{r1} + F_s = F_{r2}$$

$$\Sigma M_A = 0 \text{ then } r_{p2}(F_s + F_{r2}) = r_{p1} F_{r1}$$

In regard to the Sun gear, S, the following equations are obtained:

$$\Sigma M_B = 0 \text{ then } T_{in} = r_s(3F_s)$$

$$\text{then } F_s = T_{in}/3 \, r_s$$

In regard to the large 257R and small 234R ring gears, wherein:

$r_1$ denotes the radius of the large ring gear 257R measured to the pitch diameter of the large ring gear 257R;

$r_2$ denotes the radius of the small ring gear 234R measured to the pitch diameter of the small ring gear 234R; and, $$T_{r1} = 3(r_{r1} F_{r1}')$$

$$T_{r2} = 3(r_{r2} F_{r2})$$

Substituting:

$$F_{r1} = 2T_{in}/(3r_s((r_{p1}/r_{p2}) - 1))$$

These equations are by way of example only and are used for calculating some of the design parameters. The dimensions of the epicyclic gearbox and its components are sized according to the required load.

FIG. 2 is a perspective view 200 of the dual output pinion rack drive, 291, 292. FIG. 2 illustrates the first drive output 292, the second drive output 291, outer housing 204, the spur output pinions gear cover 205, and the motor cover 299. Flanges 201, 202 secure the first drive 292 and the second drive 291 together. Outer housing 204 is illustrated in FIG. 2. FIG. 2B illustrates the outer housing 204 with splined interior portions 210S, 211S for mating with splines 208S, 209S securing ring gears 208, 209 against rotation. First outer housing portion 204A of housing 204 includes a first outer housing engaging spline 210S which mates with spline 208S of the first ring gear 208. First ring gear 208 is part of the first final planetary gear system illustrated in FIGS. 2C, 2D and others. Second outer housing portion 204B of housing 204 includes a second outer housing portion engaging spline 211S which mates with spline 209S of the second ring gear 209. Second ring gear 209 is part of the second final planetary gear system illustrated in FIGS. 2C, 2D and others.

Figure 2A:
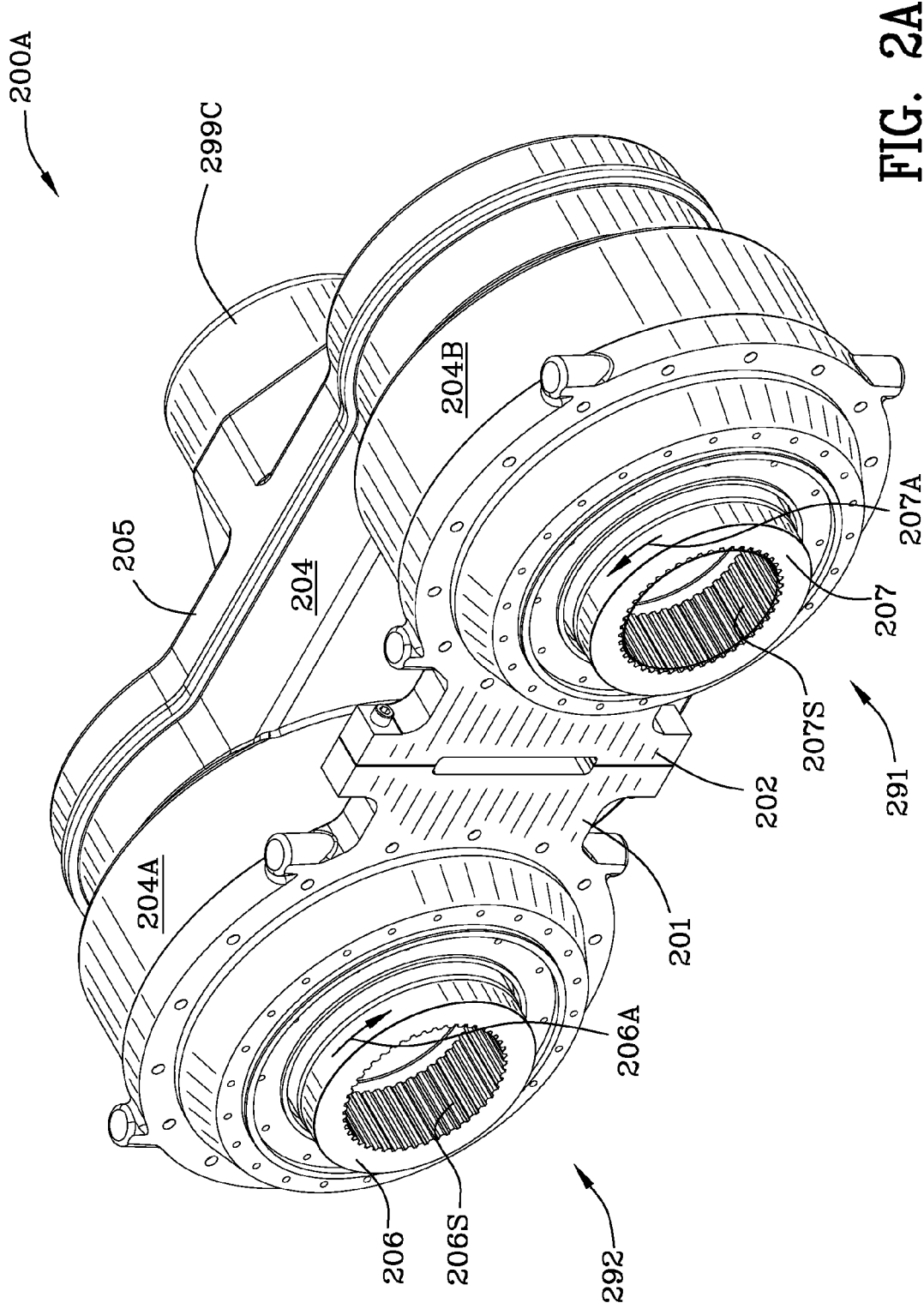
FIG. 2A is another perspective view of the dual output pinion rack drive.
Figure 2B:
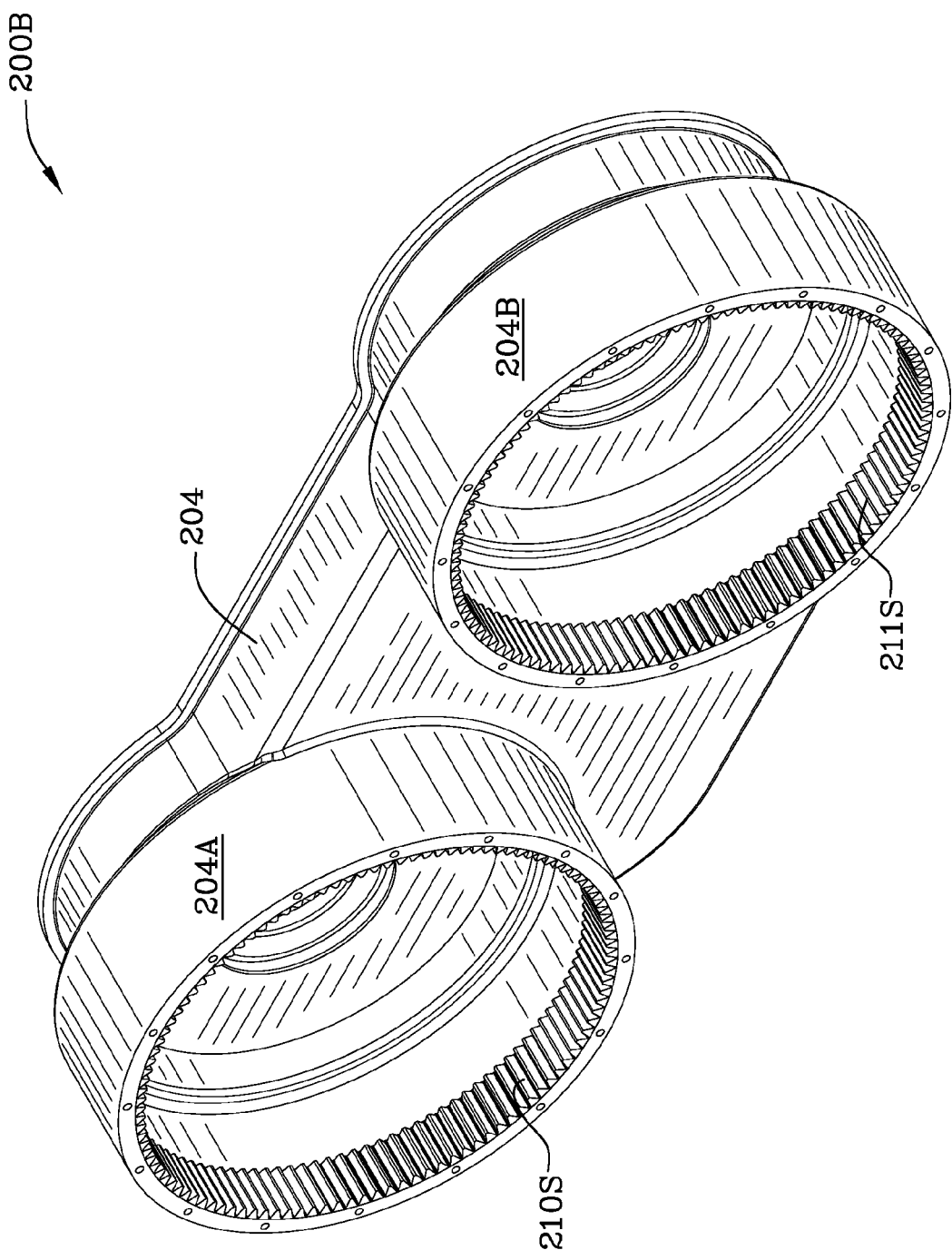
FIG. 2B is perspective view of the outer housing illustrating, inter alia, splined interior portions of the outer housing.
Figure 2C:
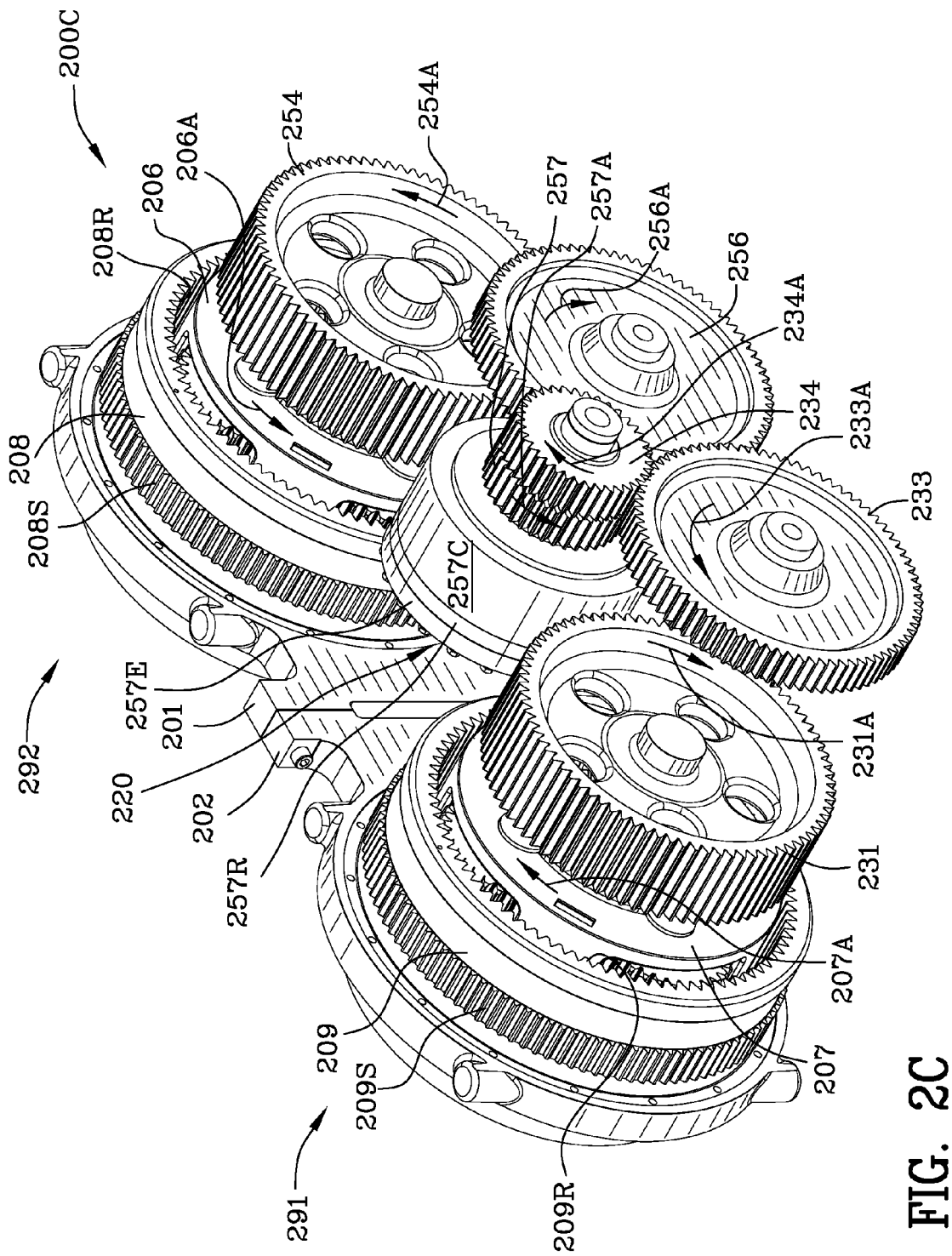
FIG. 2C is a perspective view of the dual output pinion rack drive with the outer housing and the output gear cover removed and without the drive motor.
Figure 2D:
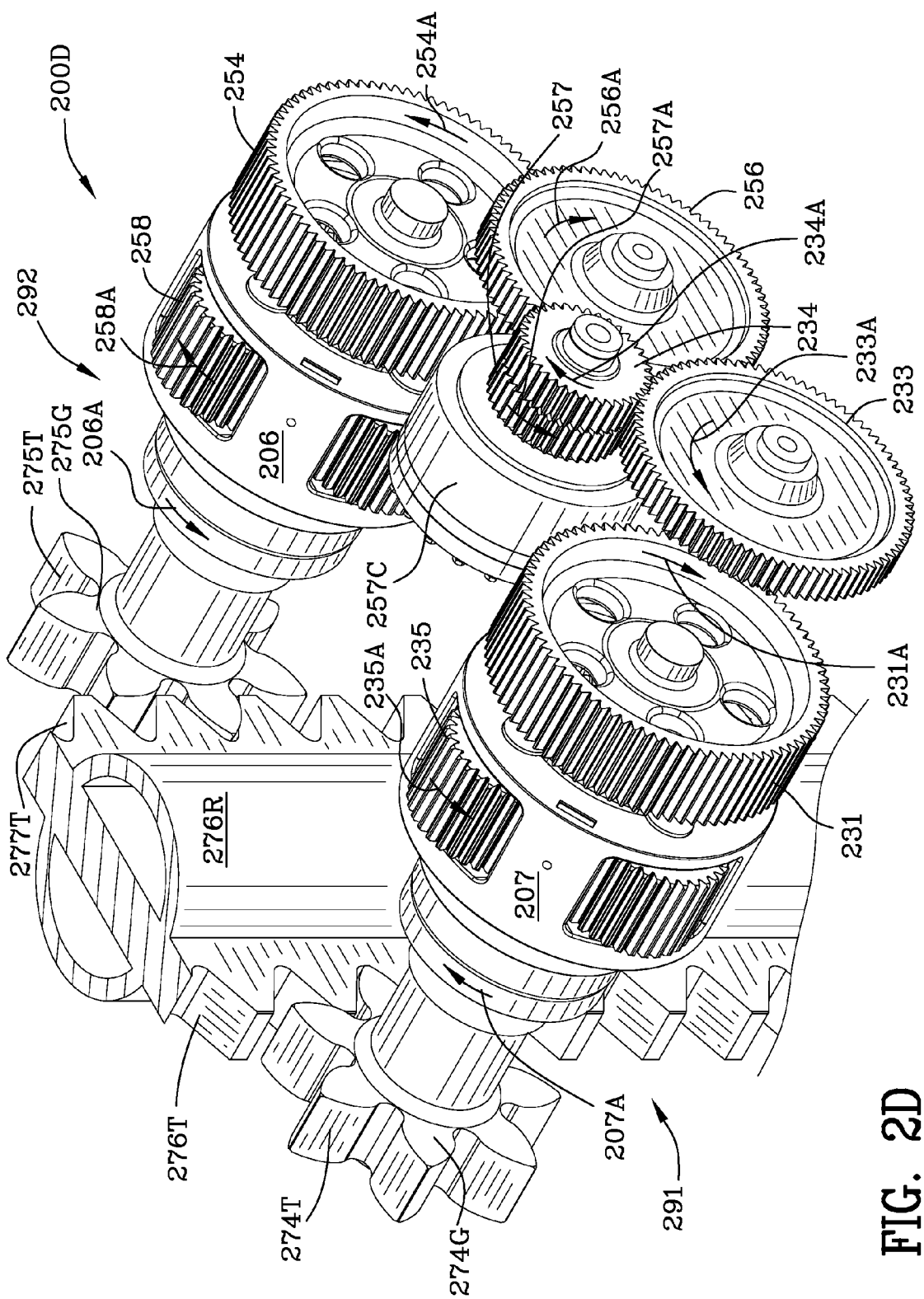
FIG. 2D is a perspective view of the dual output pinion rack drive with the outer housing and the output gear cover removed, and without the first and second ring gears of the final planetary gear systems, and without the drive motor; also, the rack and the outer drive gears are illustrated.

The first rack driving output pinion 275G and the second rack driving output pinion 274G are illustrated in FIG. 2D. FIG. 2D is a perspective view 200D of the dual output pinion rack drive 291, 292 without the outer housing 204, 204A, 204B, and without first 208 and second 209 ring gears of the final planetary gear system, and without the drive motor 299M; also, the rack 276R and the first rack driving output pinion 275G and second rack driving pinion 274G are illustrated. Rack 276R has a central portion which is cylindrically shaped with rack teeth 276T, 277T on opposite sides of the central portion. First 208 ring gear and second 209 ring gear are illustrated in FIG. 2C and these ring gears are secured in position by the splines 210S, 211S of the outer housing 204.

FIG. 2D illustrates pinion teeth 275T of the first rack driving output pinion 275G engaging teeth 277T of the first side of rack 276R. FIG. 2D also illustrates pinion teeth 274T of the second rack driving output pinion 274G engaging teeth 276T of the second side of rack 276R.

FIG. 2A is another perspective view 200A of the dual output pinion rack drive 291, 292 illustrating the first carrier 206 of the first final output planetary gear system and illustrating the second carrier 207 of the second final output planetary gear system. Rotational direction arrow 206A indicates the direction of rotation of the first final output planetary gear system. Rotational direction arrow 207A indicates the direction of rotation of the second final output planetary gear system.

Still referring to FIG. 2A, internal spline 206S is located in the carrier 206 of the first drive 292. Internal spline 207S is located in the carrier 207 of the second drive 291. First and second rack driving output pinions 275G, 274G include exterior splines (not shown) which mate with the internal splines 206S, 207S, respectively.

FIG. 2B is perspective view 200B of outer housing 204 illustrating, inter alia, splined interior portions 210S, 211S of the outer housing 204. The splined interior portions 210S, 211S of the outer housing secure the ring gears 208R, 209R against rotation with respect to the housing. In other words, the ring gears 208R, 209R are fixed to the outer housing by splines, 208S, 209S.

FIG. 2C is a perspective view 200C of the dual output pinion rack drive 292, 291 with the outer housing 204 and the output gear cover 205 removed and without the drive motor 299M. FIG. 2C illustrates the epicyclic gearbox 220 centrally located within the dual output pinion rack drive 292, 291. First spur output pinion 257 and its direction of rotation 257A are illustrated in FIG. 2C as are second spur output pinion 234 and its direction of rotation 234A. The directions of rotation are necessarily opposite to drive the dual output pinion rack drive 292, 291 (which is affixed to a platform) and the platform up and down. FIG. 2D illustrates the rack 276R, the rack driving output pinions 275G, 274G, and their direction of rotation 206A, 207A.

Figure 2E:
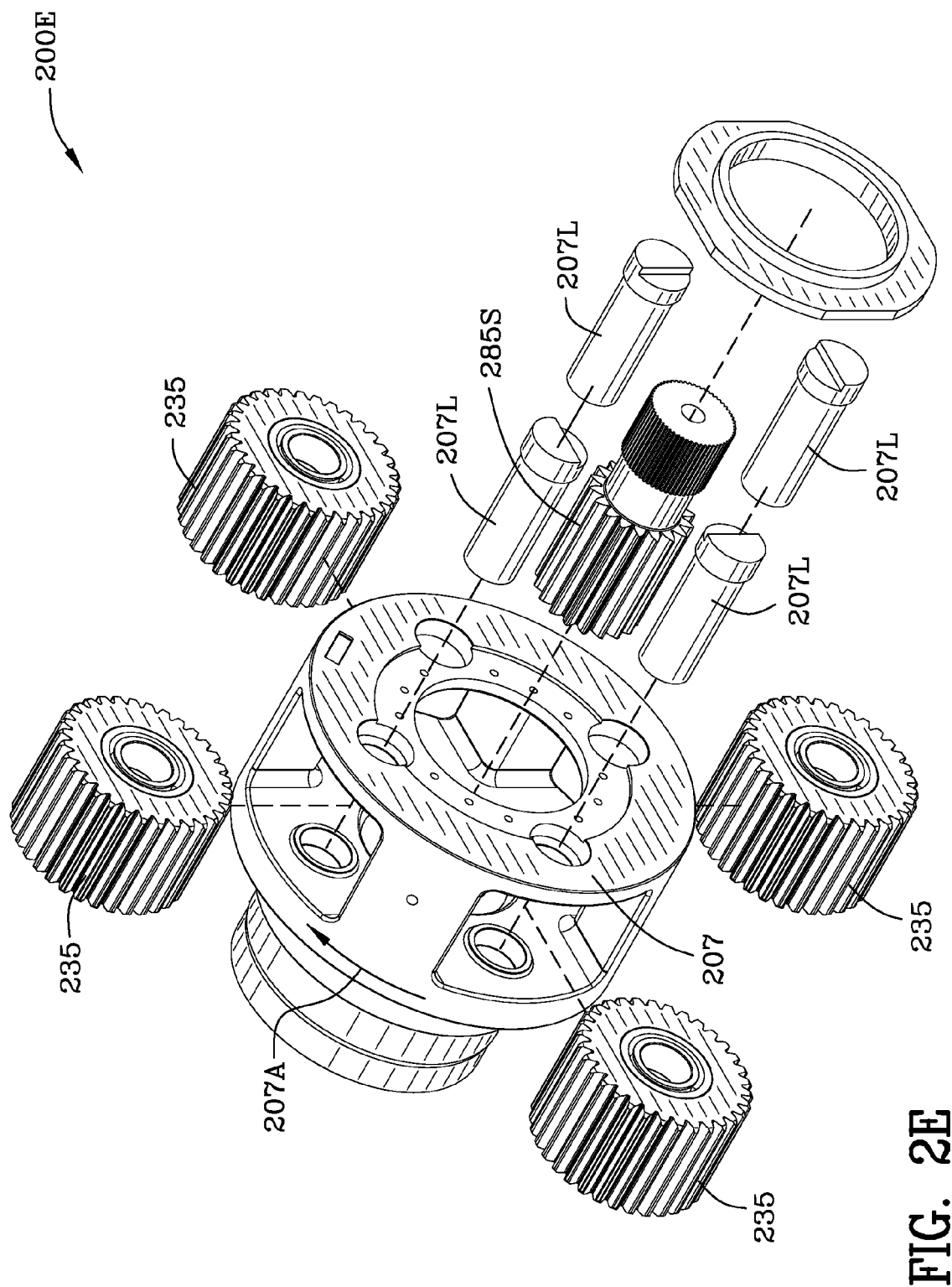
FIG. 2E is an exploded view of a portion of the second drive.
Figure 2F:
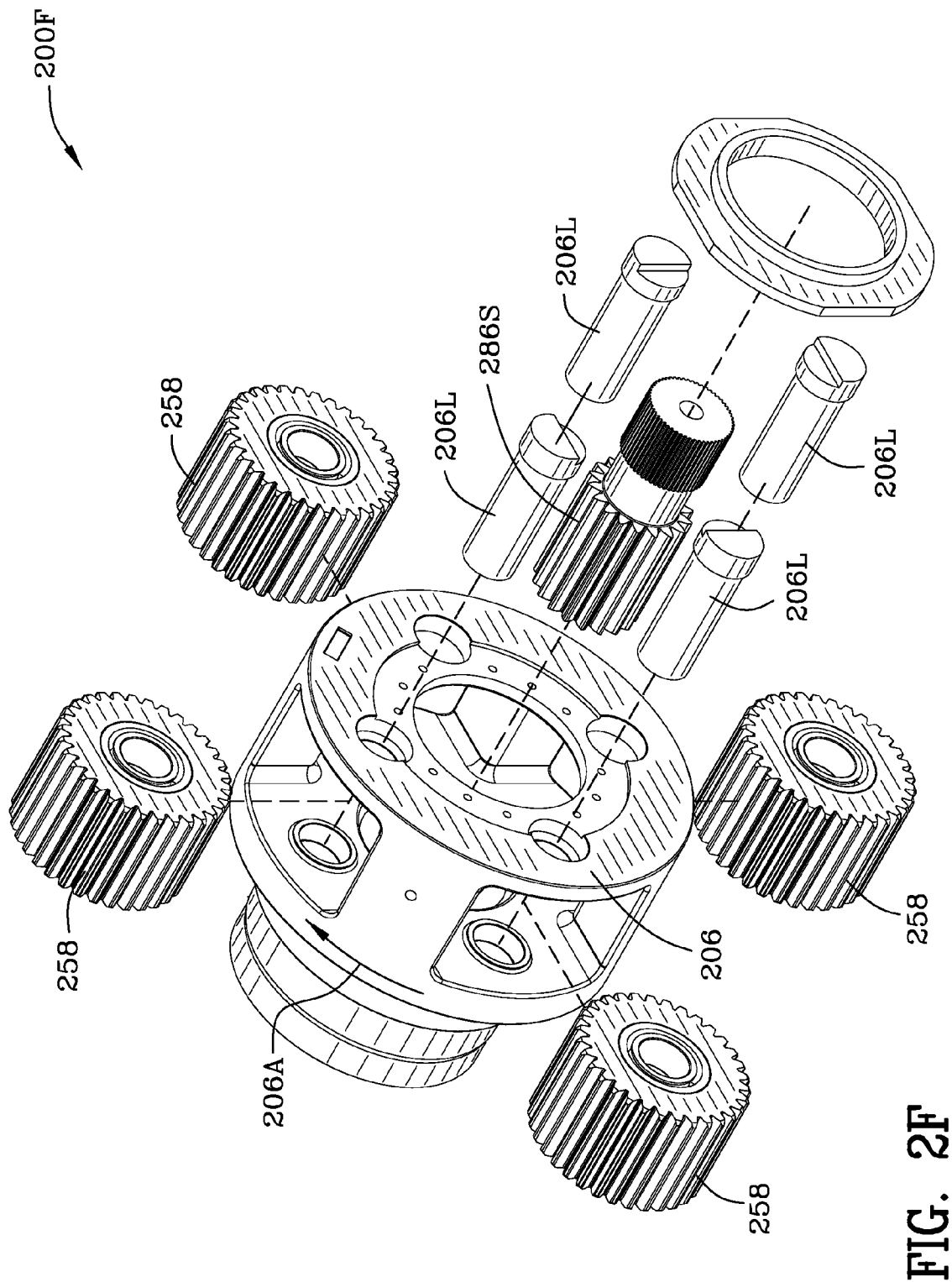
FIG. 2F is an exploded view of a portion of the first drive.
Figure 2G:
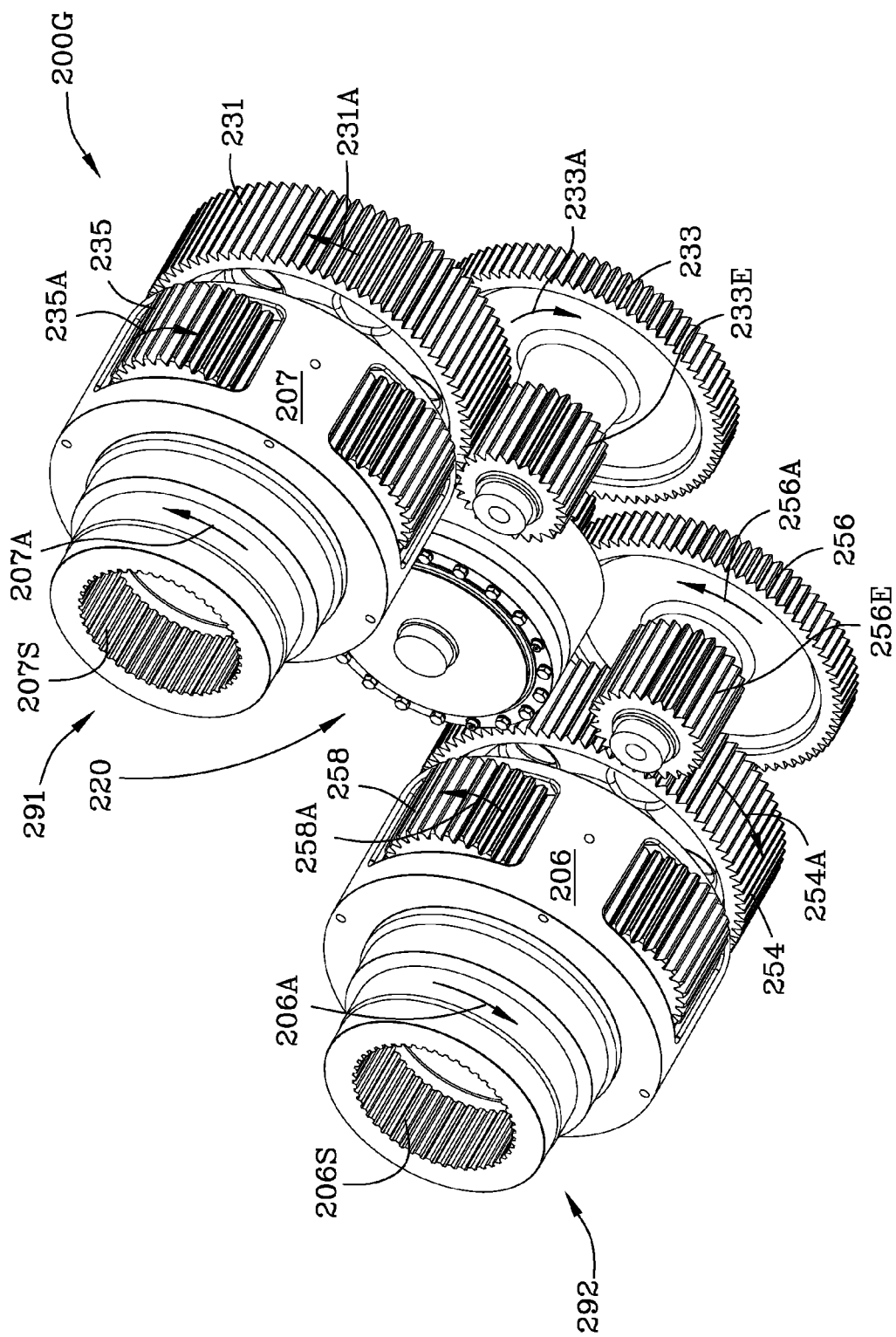
FIG. 2G is another perspective view of the dual output pinion rack drive with the outer housing and the output gear cover removed, and without the first and second ring gears of the final planetary gear systems, and without the drive motor.

FIG. 2G is another perspective view 200G of the dual output pinion rack drive 292, 291 with the outer housing 204 and the output gear cover 205 removed, and without the first and second ring gears 208R, 209R, and without the drive motor 299M. FIG. 2G illustrates the intermediate drive gear 233 for the second drive 291 driven by the second spur output pinion 234 of the epicyclic gearbox (torque splitting transmission) 220. Arrow 233A indicates the direction of rotation of intermediate drive gear 233. Intermediate gear 233E is affixed to intermediate drive gear 233 and rotates therewith. Gear reduction is effected by second spur output pinion 234 (not shown in FIG. 2G), intermediate gears 233, 233E, and intermediate gear 231. Arrow 231A indicates the direction of rotation of intermediate gear 231. Intermediate gears 233, 233E are affixed together, alternatively, it is possible that they could be manufactured from one piece.

Referring to FIGS. 2D and 2E, intermediate gear 231 is coupled to and drives sun gear 285S, which, in turn, drives the second output planetary gear system as is partially illustrated in FIG. 2E. The sun gear 285S rotates with and is splined to intermediate gear 231. Sun gear 285S rotates with and in the same direction as intermediate gear 231. Planets 235 are driven by sun 285S and rotate as indicated by arrow 235A, and react against fixed ring gear 209 (not shown). Ring gear 209 is fixed to housing 204 as previously set forth hereinabove. Carrier 207 rotates in the direction indicated by arrow 207A and rack driving output pinion 274G is coupled thereto (splined) and rotates therewith. Rack driving output pinion 274G is not shown in FIG. 2E.

Referring to FIGS. 2D and 2F, intermediate gear 254 is coupled to and drives sun gear 286S, which, in turn, drives the first output planetary gear system as illustrated therein. The sun gear 286S rotates with and is splined to intermediate gear 254. Intermediate gear 254 rotates in the direction as indicated by arrow 254A. Sun gear 286S rotates with and in the same direction as intermediate gear 254. Planets 258 are driven by sun 286S and rotate as indicated by arrow 258A, and react against fixed ring gear 208 (not shown). Ring gear 208 is fixed to housing 204 as previously set forth hereinabove. Carrier 206 rotates in the direction indicated by arrow 206A and rack driving output pinion 275G is coupled thereto (splined thereto) and rotates therewith.

FIG. 2E is an exploded view 200E of a portion of the planetary gear system of the second drive 291. FIG. 2F is an exploded view 200F of a portion of the planetary gear system of the first drive 292. Planet pins 206L are affixed to carrier 206 of the first drive 292.

Referring again to FIG. 3A, the epicyclic gearbox (torque splitting transmission) 220 and spur output pinions 257, 234 taken along the lines 3A-3A of FIG. 3 are illustrated. Unnumbered bolts are shown on end plate 257E and secure the end plate 257E, the large ring gear 257R and the cylindrical portion 257C of first spur output pinion 257 together. End plate 257E, large ring gear 257R, and cylindrical portion 257C of first spur output pinion 257 rotate together. Large ring gear 257R engages large planet gear $P_1$ and the large ring gear 257R is driven in the direction out of the page as illustrated in FIG. 3A. Referring to FIG. 3A, the symbol ⊗=direction of rotation out of the page and the symbol ⊙=direction of rotation into the page.

Still referring to FIG. 3A, large ring gear 257R, end plate 257E, and first spur output pinion 257 rotate in a direction indicated to be out of the page. Small ring gear 234R, connection plate 280, and second spur output pinion 234 rotate in the direction indicated to be into the page. Small ring gear 234R rotates freely within and does not engage the cylindrical portion 257C of the first spur output pinion 257 although they are in a timed relationship with each other. The outer diameter of the small ring gear 234R is less than the inner diameter of cylindrical portion 257C. Bearings 265 are supported by a frame (not shown) and support and enable rotation of the large ring gear 257R, end plate 257E, and first spur output pinion 257 in the direction out of the page (FIG. 3A). Bearings 263, 264 enable first spur output pinion 257 to rotate with respect to the connection body 280 and the second spur output pinion 234 affixed to the connection by spline connection 234S, 281S.

As there are no rotationally fixed components in the epicyclic gearbox 220, each ring gear 234R, 257R acts as a reference to each other. Due to variations in the teeth 276T, 277T of rack 276R, one of the first spur output pinion 257 and the second spur output pinion 234 is rotationally out of phase with respect to the other due to variations in rack geometry.

Further, mounting variations of the dual output pinion rack drive may contribute to the first and second spur output pinions operating in the proper timed relationship to each other.

Still further, due to variations:

in the first compound intermediate gear set 256, 256E, 254, a first final output planetary gear system, a first final output planetary gear system carrier 206, the teeth 275T of the first rack driving output pinion 275G, and the first teeth 277T of the first side of the rack 276R; and/or, a second compound intermediate gear set 233, 233E, 231, a second final output planetary gear system, a second final output planetary gear system carrier 207, the teeth 274T of the second rack driving output pinion 274G, and the second teeth 276T of the second side of the rack 276R; one of the first spur output pinion 257 and the second spur output pinion 234 is out of phase at with respect to the other.

Further, due to variations in any of the gearing components in the dual output pinion rack drive, 292, 291, one of the first spur output pinion 257 and the second spur output pinion 234 is out of phase with respect to the other.

Planet pin 257L secures cluster planet gears $P_1$, $P_2$ to the planet carrier 220C. Small ring gear 234R engages small planet gear $P_2$. Planet carrier 220C floats and is not fixed rotationally. None of the components of the epicyclic gearbox are fixed rotationally. Bearings 261, 262 reside between planet pin 257L and the cluster planet gears $P_1$, $P_2$ for support thereof.

Figure 3C:
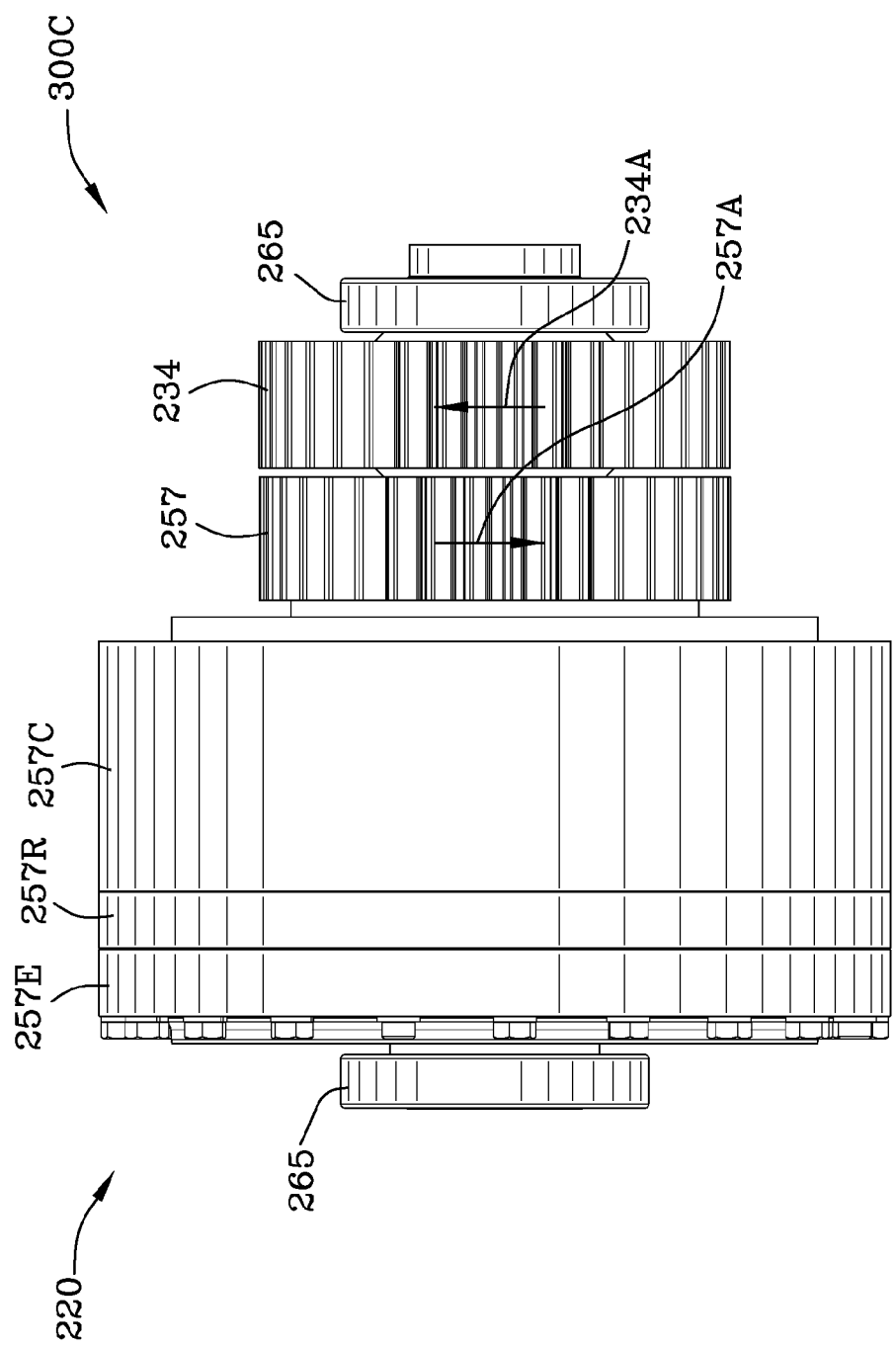
FIG. 3C is an elevation view of the epicyclic gearbox (torque splitting transmission) and spur output pinions.
Figure 3D:
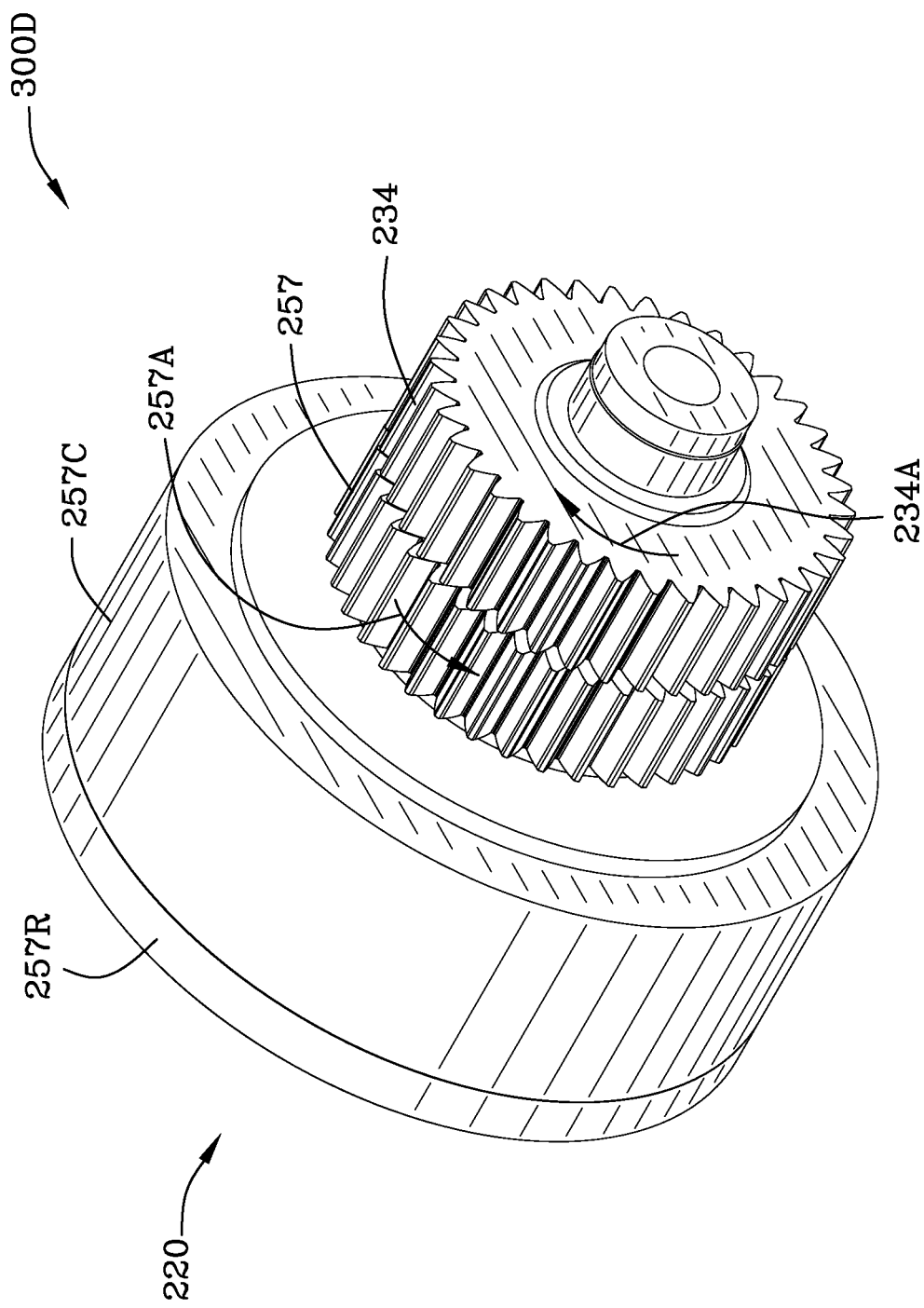
FIG. 3D is another perspective view of the epicyclic gearbox (torque splitting transmission) and spur output pinions.
Figure 3E:
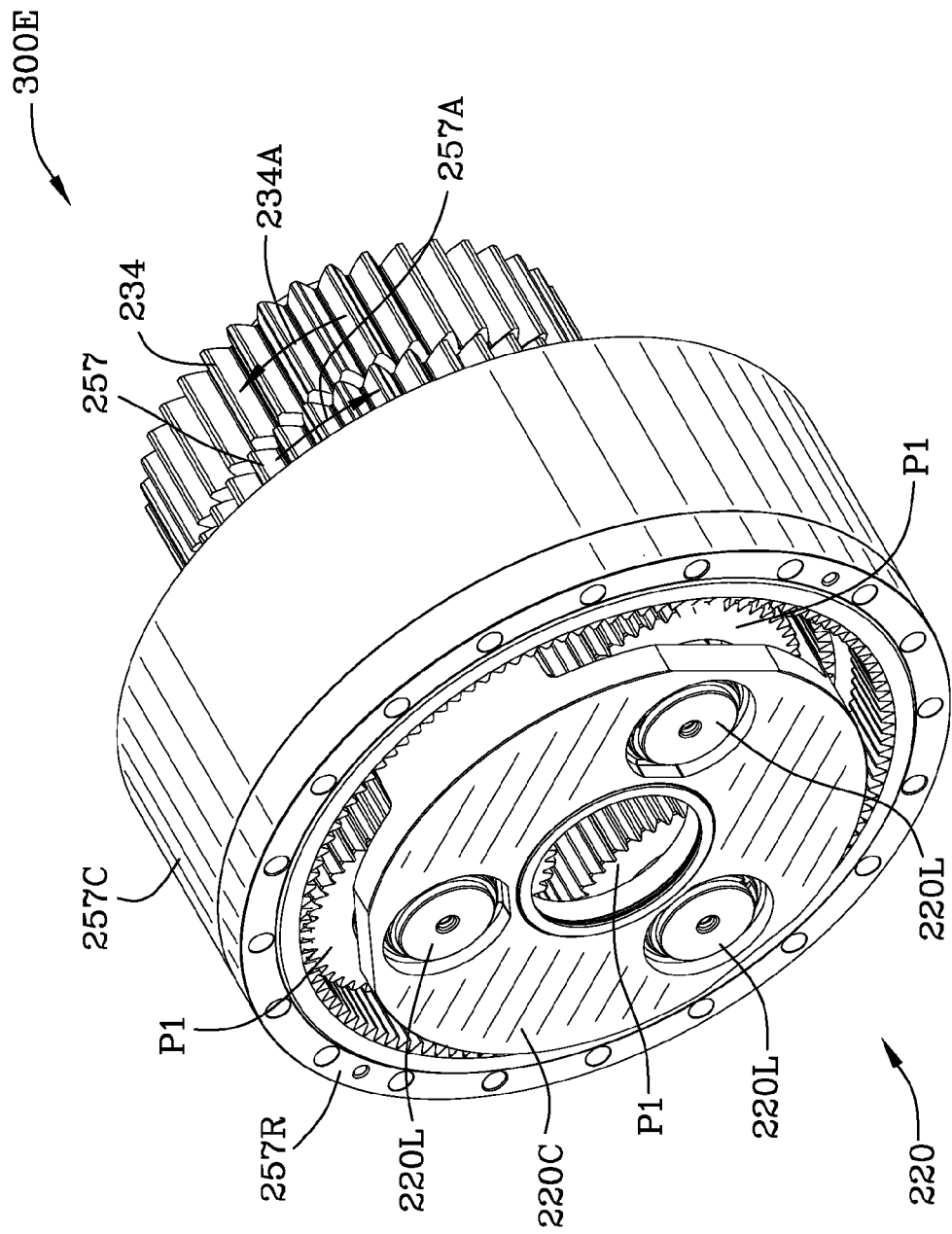
FIG. 3E is a perspective view of the epicyclic gearbox (torque splitting transmission) and spur output pinions without the end plate shown.

Still referring to FIG. 3A, motor 299M is fixed to the cover 299C. Motor 299M rotates shaft 299S and applies torque, $T_M$, thereto. Referring to FIG. 3B, shaft 299S includes an external spline 298S which matingly fits into sleeve 301. Sleeve 301 includes an internal spline 301S which mates with the external spline 298S of shaft 299S. Sleeve 301 is restrained from moving longitudinally (in the direction of the shaft by parts not illustrated) and rotates within the second spur output pinion 234 as illustrated in FIG. 3A. Pin 301P includes an external spline 303S which matingly engages an internal spline 302S on the sun gear, S. Sun gear S engages small planet gear $P_2$ and drives cluster planet gears $P_1$, $P_2$ Cluster planet gears $P_1$, $P_2$ are integral, concentric and illustrated in FIG. 3K. FIG. 3K is a perspective view 300K of the large $P_1$ and small $P_2$ planet gears.

Figure 3F:
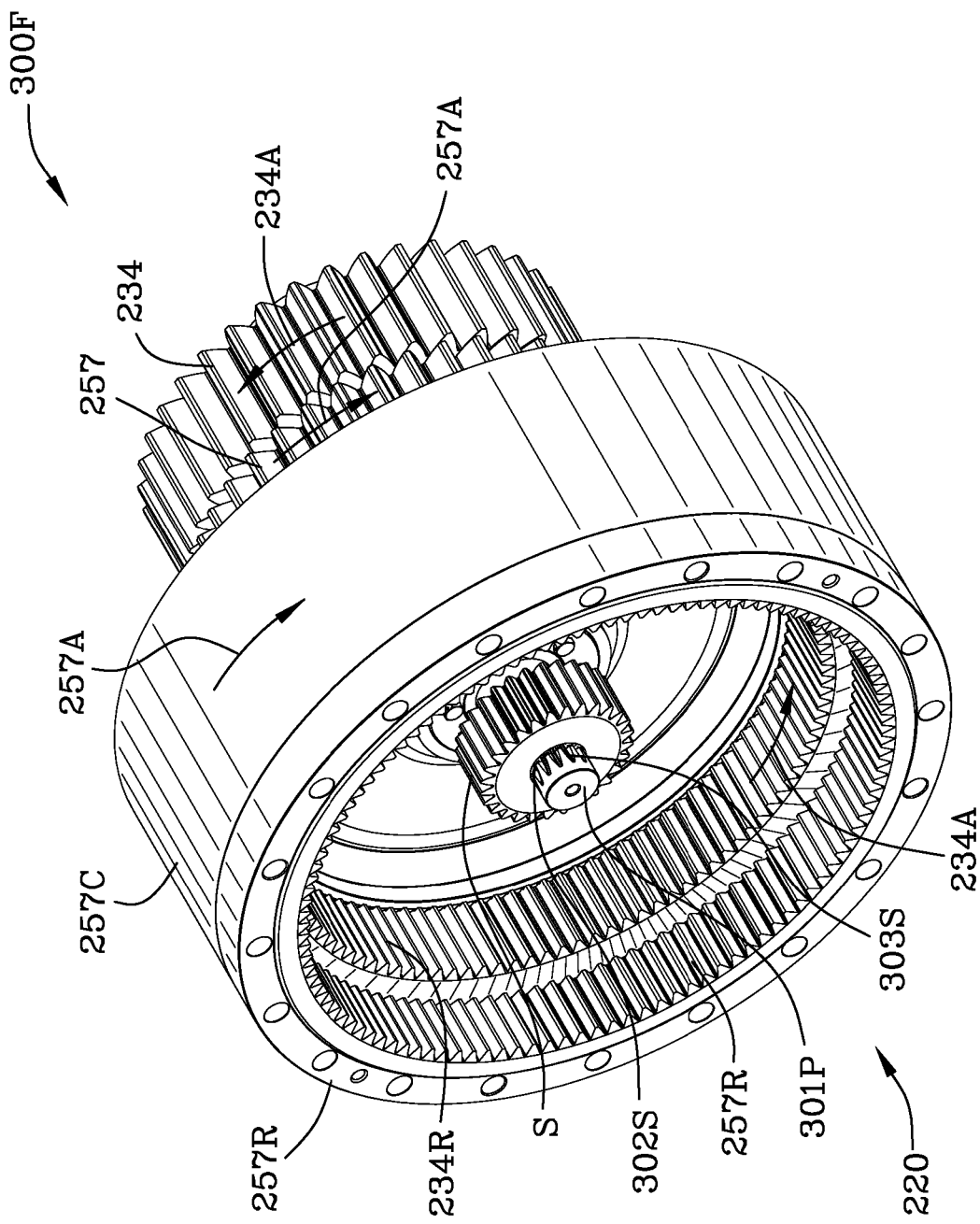
FIG. 3F is a perspective view of the epicyclic gearbox (torque splitting transmission) and spur output pinions without the end plate, carrier, and planet gears.
Figure 3G:
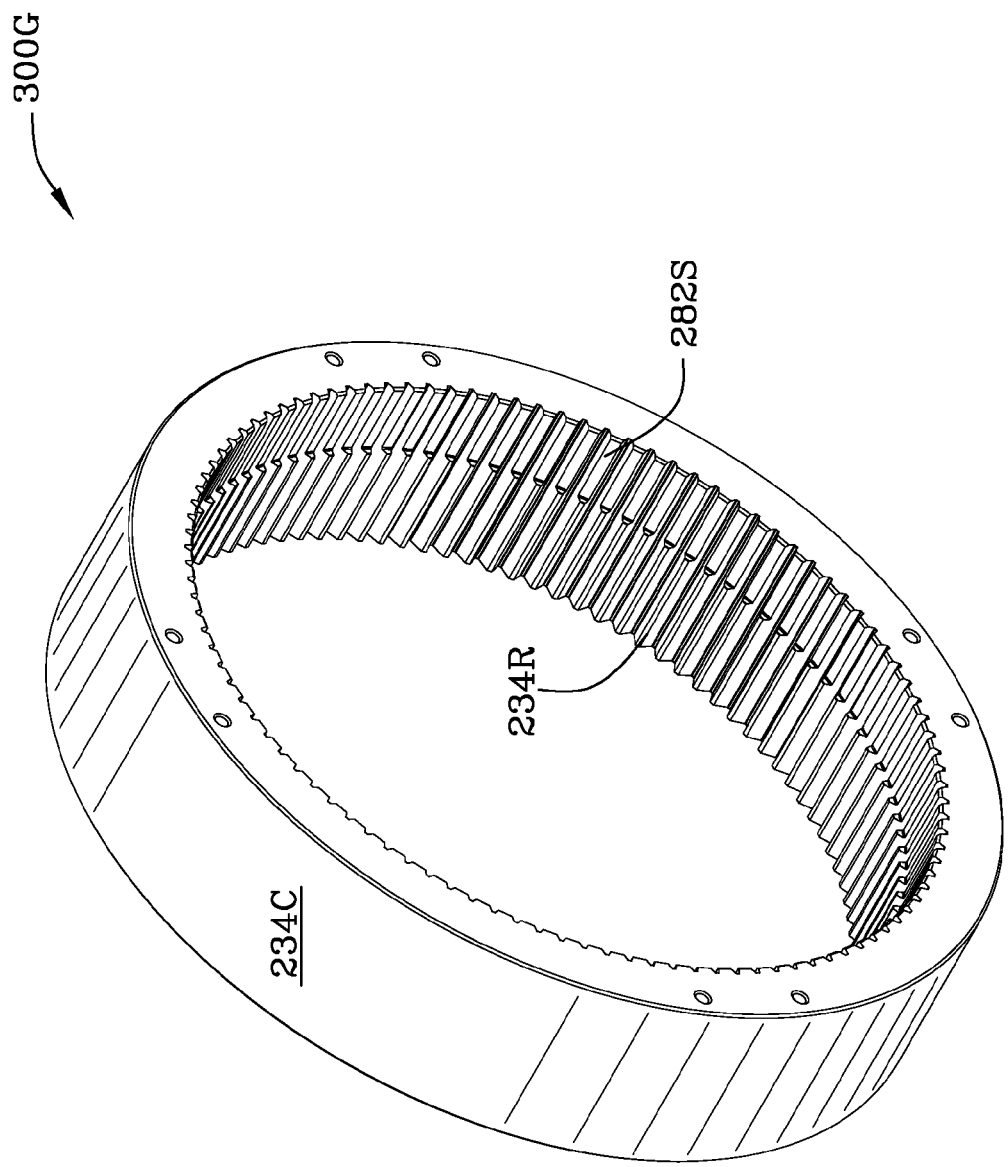
FIG. 3G is a perspective view of the small diameter ring gear.
Figure 3H:
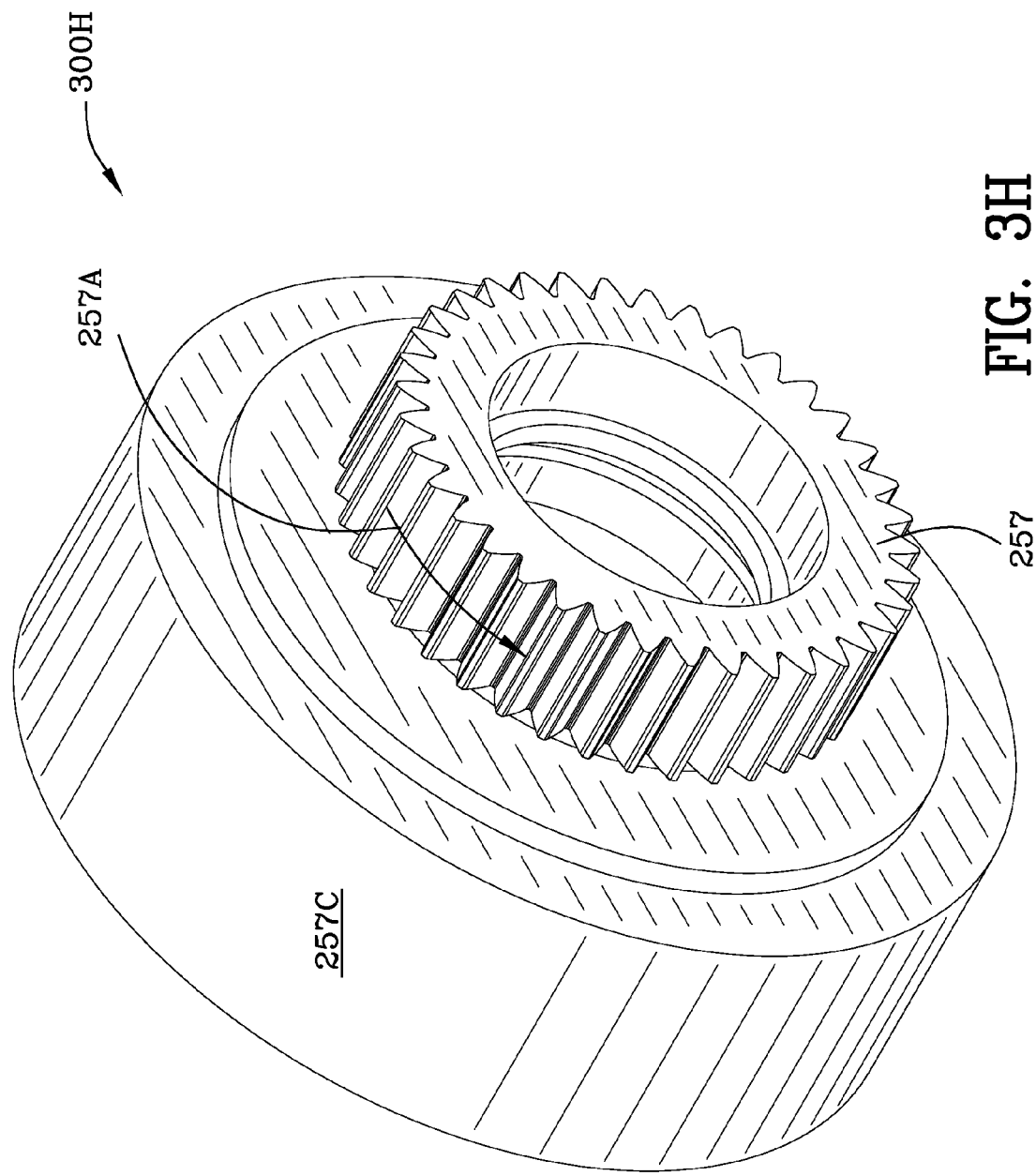
FIG. 3H is a perspective view of the first spur output pinion output including the cylindrical portion thereof.
Figure 3J:
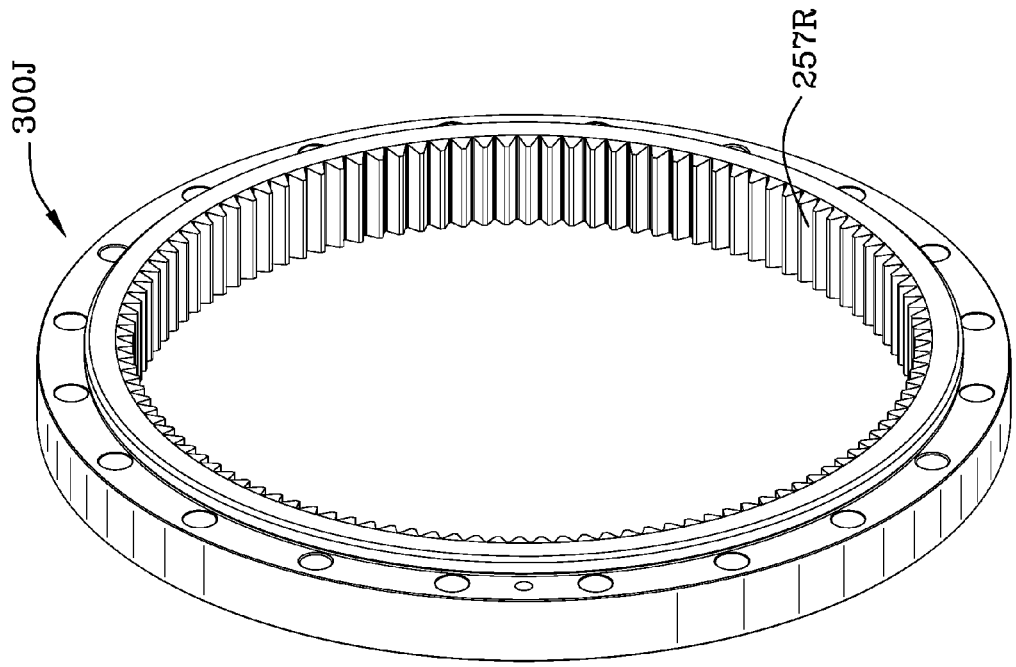
FIG. 3J is a perspective view of the large ring gear.
Figure 3I:
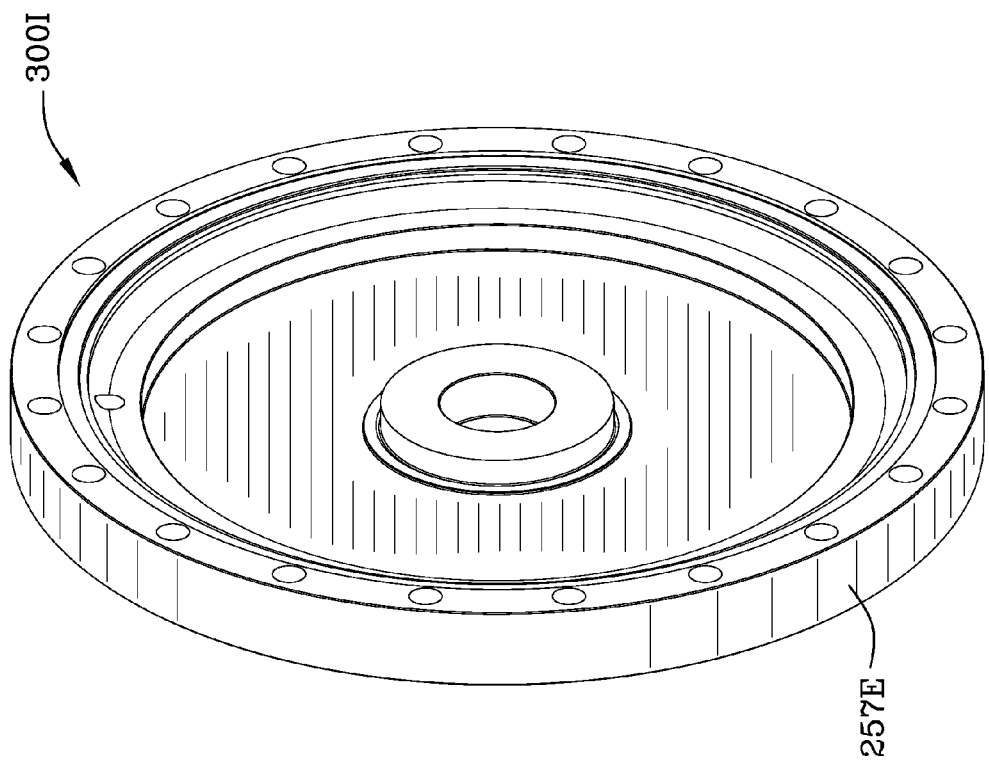
FIG. 3I is a perspective view of the end plate.
Figure 3K:
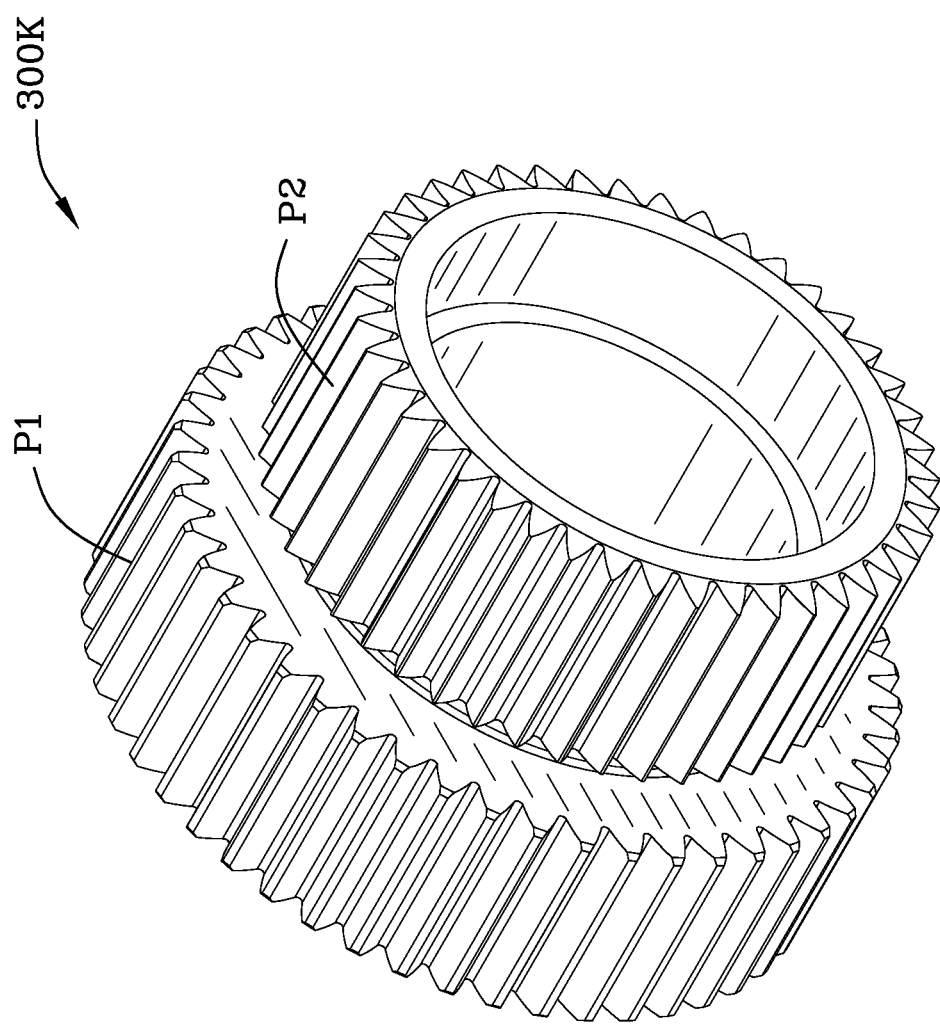
FIG. 3K is a perspective view of one of the large and small planet gears which comprise the cluster gear.
Figure 3L:
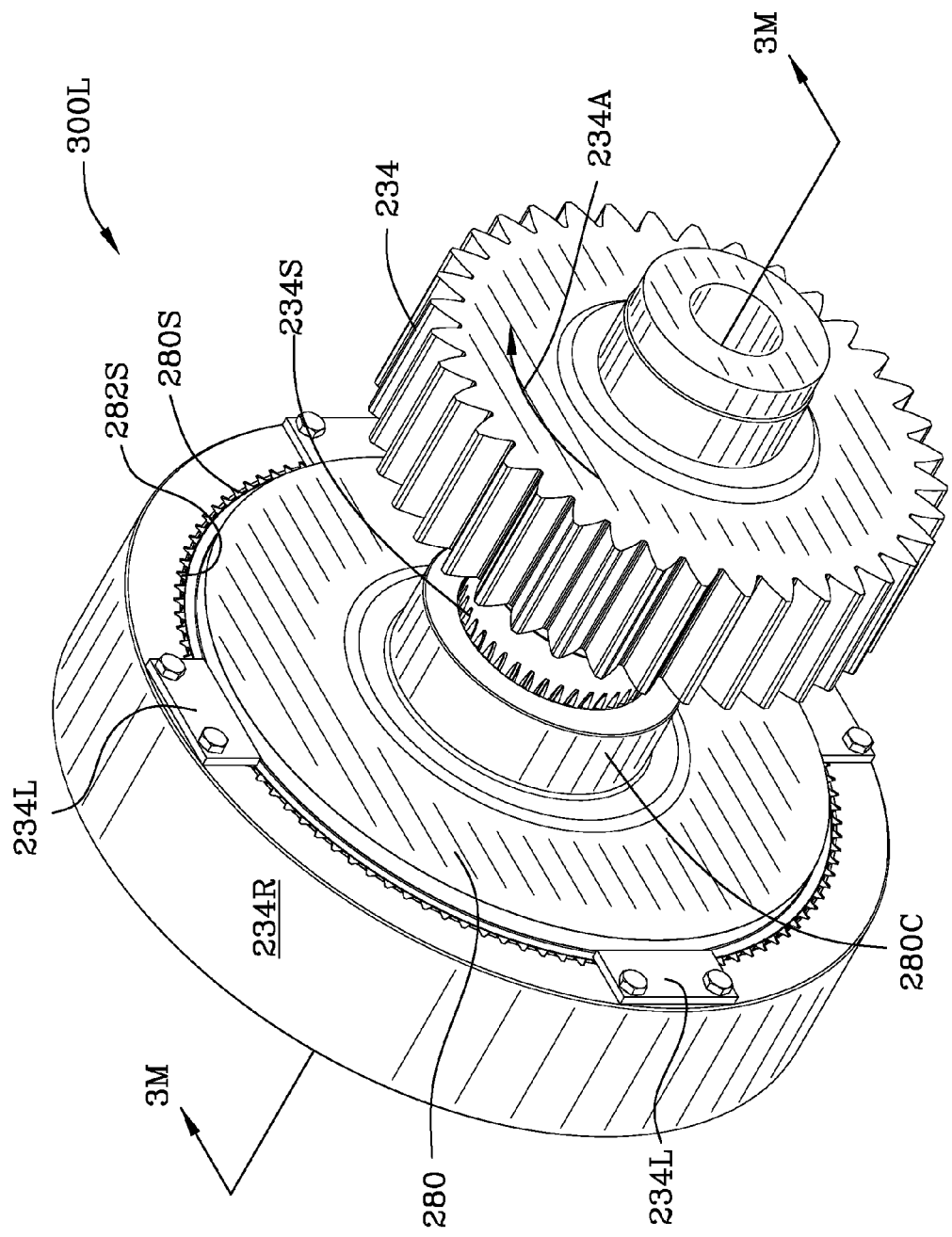
FIG. 3L is a perspective view of the second spur output pinion interconnected with the connection plate and the small ring gear.
Figure 3M:
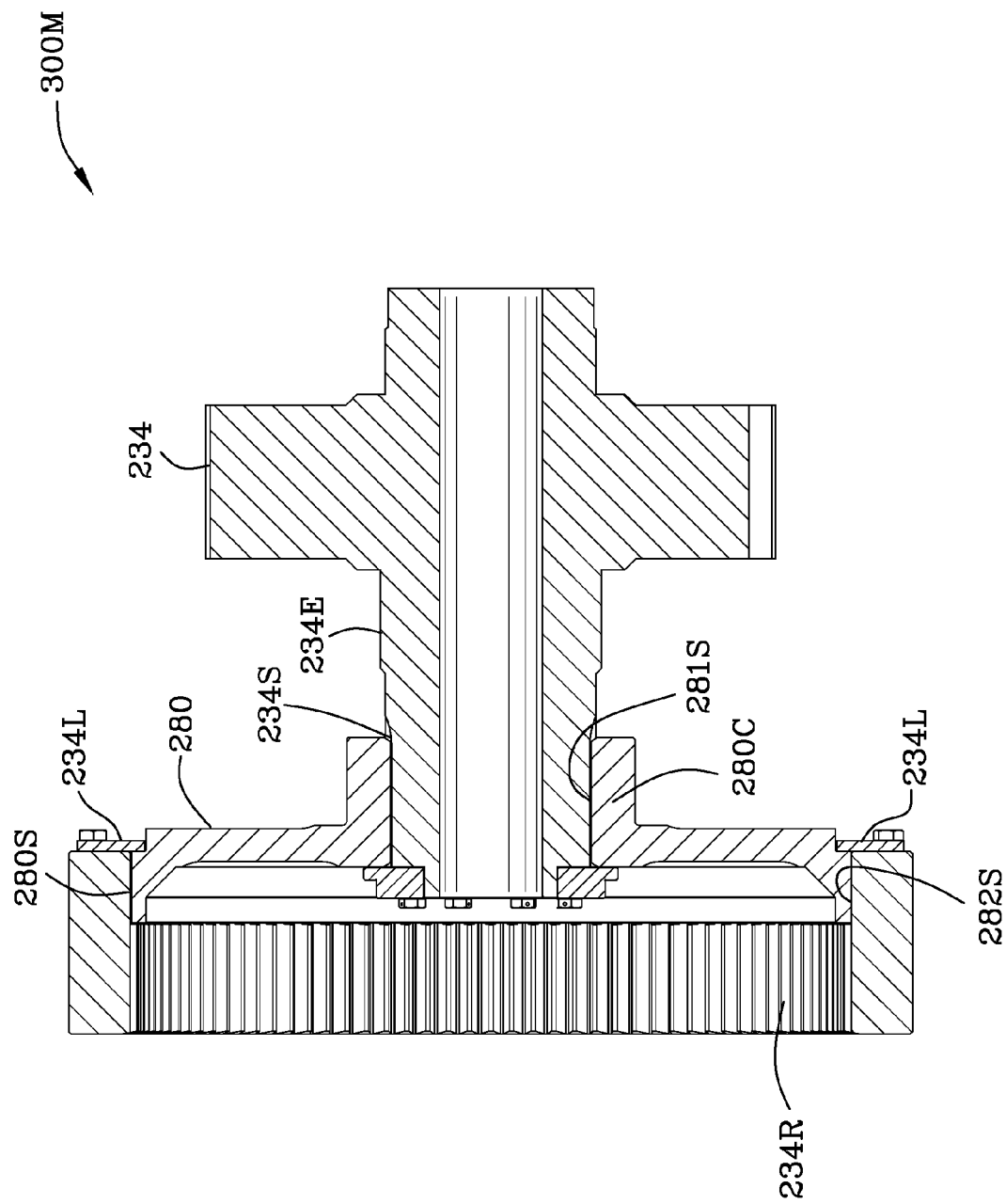
FIG. 3M is a cross-sectional view of the small diameter ring gear, the connection plate, the spline of the shaft end of the second spur output pinion, and the second spur output pinion.

Still referring to FIG. 3A and also referring to FIGS. 3L and 3M, second spur output pinion 234 includes a shaft 234E with an external spline 234S which mates with an internal spline 281S of a cylindrical portion 280C of connection plate 280. Connection plate 280 includes an external spline 280S which mates with an internal spline 282S of small ring gear 234R. Retainers 234L illustrated in FIG. 3L limit the motion of the connection plate 280 with respect to the small ring gear 234R.

FIG. 3F is a perspective view 300F of epicyclic gearbox (torque splitting transmission) 220, and first and second spur output pinions, 257, 234, sun S, and without end plate 257E, carrier 220C, and without cluster planet gears $P_1$, $P_2$ Both ring gears 257R, 234R are illustrated in FIG. 3F. Small ring gear 234R rotates as indicated by arrow 234A within the cylindrical portion 257C of first spur output pinion 257. Arrows 257A and 234A illustrate that the large and small ring gears 257R, 234R rotate in opposite directions.

FIG. 3G is a perspective view 300G of the small diameter ring gear 234R. Internal spline 282S is illustrated in FIG. 3G and it mates with external spline 280S of the connection plate 280 as illustrated in FIGS. 3L and 3M.

FIG. 3C is an elevation view 300C of epicyclic gearbox (torque splitting transmission) 220 and spur output pinions, 257, 234 along with arrows 257A, 234A indicating the direction of rotation of the spur output pinions. The outside of the cylindrical portion 257C, the outside of large ring gear 257R, and the end plate 257E is illustrated in FIG. 3C. Unnumbered bolts secure rotating parts 257C, 257R and 257E together.

FIG. 3D is another perspective view 300D of epicyclic gearbox (torque splitting transmission) 220 and spur output pinions, 257, 234. FIG. 3E is a perspective view 300E of the epicyclic gearbox (torque splitting transmission) 220 and spur output pinions 257, 234 without the end plate 257E shown. Large planet gears $P_1$ are illustrated and there are preferably three of them. Planet carrier 220C, planet pins 220L, large ring gear 257R, and the cylindrical portion of first spur output pinion 257 is shown.

FIG. 3L is a perspective view 300L of second spur output pinion 234 interconnected with the connection plate 280 and the small ring gear 234R. Small ring gear 234R fits within the cylindrical portion 257C of the first spur output pinion 257 and rotates therein with respect to the first spur output pinion 257 and the large ring gear 257R. FIG. 3M is a cross-sectional view 300M of the small diameter ring gear 234R, the connection plate 280, the spline 234S of the shaft portion 234E of the second spur output pinion 234. FIG. 3M illustrates the spline interconnections 234S, 281S between the shaft 234E and the cylindrical portion 280C. Further, spline interconnections 280S, 282S between the connection plate 280 and the small ring gear 234R is shown in FIG. 3M.

FIG. 3H is a perspective view 300H of the first spur output pinion 257 including the cylindrical portion 257C thereof. FIG. 3I is a perspective view 300I of end plate 257E of the epicyclic gearbox 220. FIG. 3J is a perspective view 300J of the large ring gear 257R. Unnumbered bolt holes are shown which are used for securing the large ring gear 257R to the cylindrical portion 257C of the first spur output pinion 257 and to the end plate 257E.

Figure 3N:
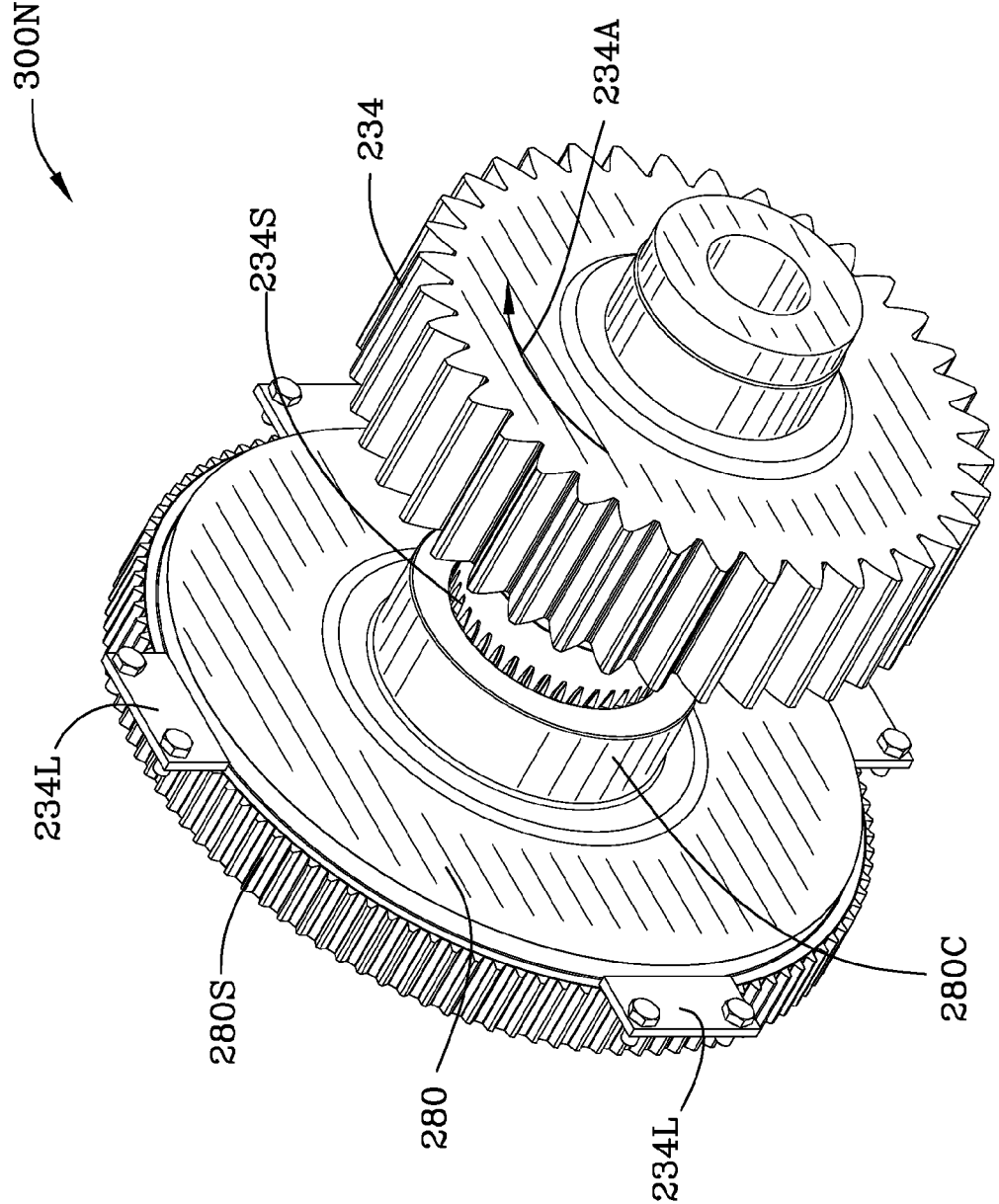
FIG. 3N is a perspective view of the second spur output pinion interconnected with the connection plate.

FIG. 3N is a perspective view 300N of the second spur output pinion 234 interconnected with the connection plate 280. Connection plate 280 includes a cylindrical portion 280C which includes an internal spline 281S viewable in FIG. 3M. FIG. 3N illustrates external spline 280S of the connection plate 280 which mates with the internal spline 282S of the small diameter ring gear 234R as illustrated in FIGS. 3L and 3M. FIG. 3O is a perspective view of the second spur output pinion 234 and spline connection 234S.

Figure 3P:
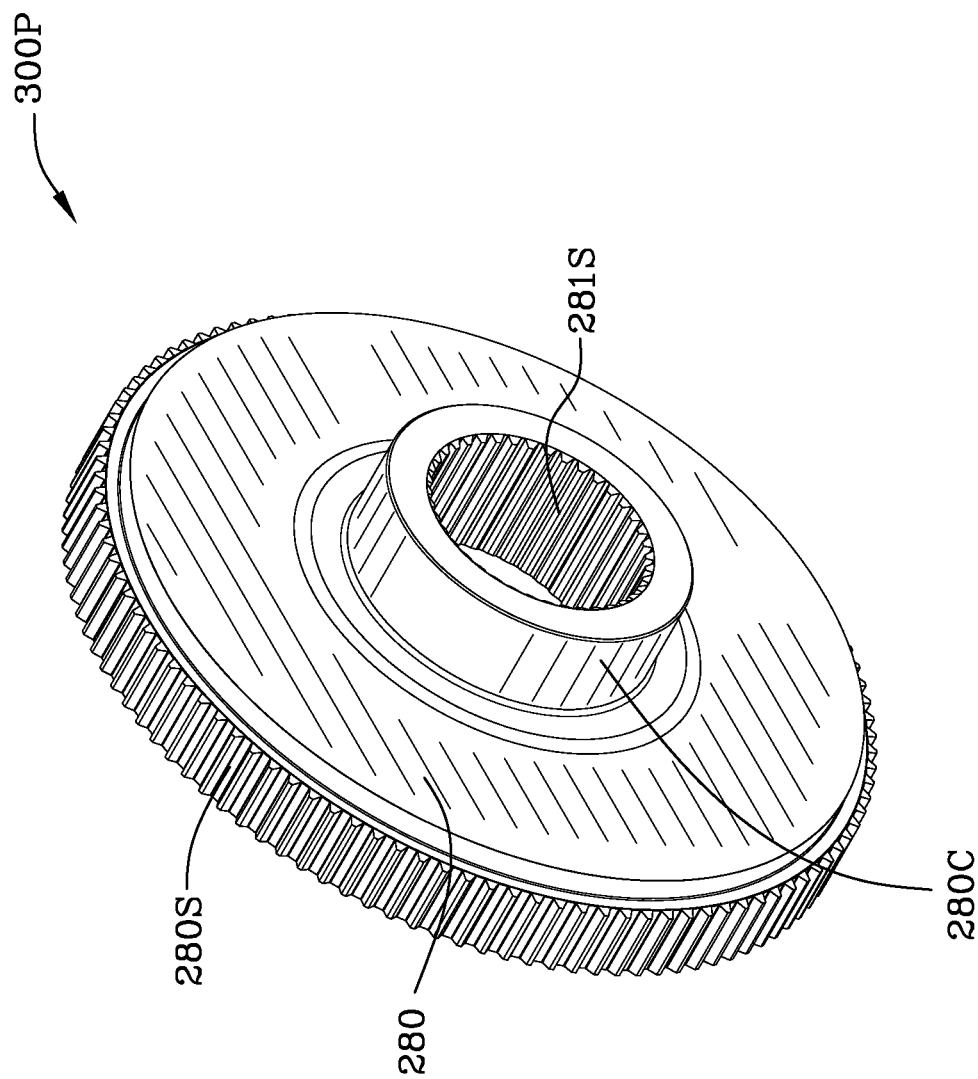
FIG. 3P is a perspective view of the connection plate and splines thereof.

FIG. 3P is a perspective view of the connection plate 280, the cylindrical portion 280C with internal spline 281S, and external spline 280S.

REFERENCE NUMERALS

100A—schematic free body diagram of first ring gear
100B—schematic free body diagram of second ring gear
100C—schematic free body diagram of planet gears $P_1$ and $P_2$
100D—schematic free body diagram of sun gear
200—perspective view of the dual output pinion rack drive
200A—another perspective view of the dual output pinion rack drive
200B—perspective view of outer housing illustrating, inter alia, splined portions 204A, 204B of the outer housing 204
200C—perspective view of the dual output pinion rack drive with outer housing 204 and output gear cover 205 removed and without the drive motor
200D—perspective view of the dual output pinion rack drive with outer housing 204 and output gear cover 205 removed, and without first and second ring gears 208, 209, and without the drive motor
200E—exploded view of a portion of the second drive 292
200F—exploded view of a portion of the first drive 291
200G—another perspective view of the dual output pinion rack drive with outer housing 204 and output gear cover 205 removed, and without first and second ring gears 208, 209, and without the drive motor
201—flange connection of first drive
202—flange connection of second drive
204—outer housing with splined interior portions for mating with the ring gears of the first and second planetary gear systems
204A—first outer housing portion with internal spline 210S engaging spline 208S of first ring gear 208
204B—second outer housing portion with internal spline 211S engaging spline 209S of second ring gear 209
205—spur output pinion gear cover
206—carrier output of first drive 292
206A—arrow indicating direction of rotation of first drive
206L—planet pins affixed to carrier 206 of the first drive 292
206S—spline of first drive 292
207—carrier output of second drive 291
207A-arrow indicating direction of rotation of second drive
207L—planet pins affixed to carrier 207 of the second drive 291
207S—spline of second drive 291
208—first ring gear of first planetary gear system affixed to outer housing portion 204A
208R—internal ring gear teeth which engages planet gears 258 of the output drive 292
208S—external spline on the outer portion of the first ring gear 208 which engages with internal spline 210S of first outer housing portion 204A
209—second ring gear of second planetary gear system affixed to outer housing portion 204B
209R—internal ring gear teeth which engages planet gears 235 of the output drive 291
209S—external spline on the outer portion of the first ring gear 209 which engages with internal spline 211S of second outer housing portion 204B
210S—internal spline on outer housing portion 204A mating with spline 208S of first ring gear 208
211S—internal spline on outer housing portion 204B mating with spline 209S of second ring gear 209
220—epicyclic gearbox (torque splitting transmission) with dual spur output pinions
220C—planet carrier of the epicyclic gearbox (torque splitting transmission)
220L—planet pins about which planet gears P1, P2 rotate
231—intermediate drive gear for the second drive coupled to the sun gear of the second planetary gear system of the second drive
231A—arrow indicating the direction of rotation of intermediate gear 231
233—intermediate drive gear for the second drive driven by spur output pinion 234 of the epicyclic gearbox (torque splitting transmission) 220
233A—arrow indicating the direction of rotation of intermediate drive gear 233
233E—intermediate gear affixed to intermediate drive gear 233 and rotating therewith
234—second spur output pinion of epicyclic gearbox (torque splitting transmission) 220 driving the second drive 291
234A—arrow indicating direction of rotation of second spur output pinion 234
235—planet gears of second planetary gear system of the second output drive 291
235A—arrow indicating direction of rotation of planet gears of second output drive 291
234E—shaft extension of spur output pinion 234
234R—small diameter ring gear affixed by a splined connection to the cylindrical portion of connection plate 280, the connection plate 280 affixed by a spline connection to the second spur output pinion 234 of the epicyclic gearbox (torque splitting transmission) 220 which powers second drive 291
234S—exterior spline on shaft of second spur output pinion 234 of epicyclic gearbox (torque splitting transmission) 220
234L—blocking plate preventing movement of external spline 280S of connection plate 280 with respect to internal spline 282S of large ring gear 234R
254—intermediate drive gear for the first drive coupled to the sun gear of the first planetary gear system of the first drive
254A—arrow indicating the direction of rotation of intermediate gear 254
256—intermediate drive gear for the first drive driven by the first spur output pinion 257 of the epicyclic gearbox (torque splitting transmission) 220
256A—arrow indicating the direction of rotation of intermediate drive gear 256
256E—intermediate gear affixed to intermediate drive gear 256 and rotating therewith
257—first spur output pinion of epicyclic gearbox (torque splitting transmission) 220 driving the first drive 292
257A—arrow indicating the direction of rotation of first spur output pinion 257 of epicyclic gearbox (torque splitting transmission) 220
257C—cylindrical portion integral with first spur output pinion 257 of the epicyclic gearbox (torque splitting transmission) 220 which is affixed to large ring gear 257R
257E—end plate of the epicyclic gearbox (torque splitting transmission) 220 affixed to the large ring gear 257R and affixed to cylindrical portion 257C integral with the first spur pinion output 257 of the compound epicyclic gearbox 220
257R—large diameter ring gear affixed to cylindrical portion 257C and integral with first spur pinion output 257 of the epicyclic gearbox (torque splitting transmission) 220 which powers first drive 292

258—planet gears of first output drive 292

258A—arrow indicating direction of rotation of planet gears of first output drive 292 261, 262, 263, 264, 265—bearings

274G—second rack driving output pinion

275G—first rack driving output pinion

274T—teeth of second rack driving pinion 274G which engage rack teeth 276T of rack 276R

275T—teeth of first rack driving pinion 275G which engage rack teeth 277T of rack 276R

276R—cylindrically shaped central portion of the rack

276T—second teeth of rack 276R which engage teeth 274T of second rack driving output pinion 274G

277T—first teeth of rack 276R which engage teeth 275T of first rack driving output pinion 275G

280—connection plate splined to second spur pinion output 234 of the epicyclic gearbox (torque splitting transmission) 220 which powers the second drive 291

280C—cylindrical portion of connection plate 280 having internal spline 281S

280S—external spline on connection plate 280 mating with internal spline 282S on small ring gear 234R

281S—internal spline of cylindrical portion 280C of connection plate 280 which mates with external spline 234S of second spur output pinion

282S—internal spline on small ring gear 234R mating with external spline 280S on connection plate 280

285S—sun gear of second drive 291

286S—sun gear of first drive 292

291—second drive

292—first drive

298S—external spline on motor shaft 299S

299C—motor housing

299M—diagrammatic illustration of the motor 299M powering the dual output pinion rack drive

299S—motor input shaft with external spline 298S that mates with drive sleeve 301

300—perspective view of the epicyclic gearbox (torque splitting transmission) 220, spur output pinions 234, 257 and intermediate gears 233, 233E and 256

300A—cross-sectional view of the epicyclic gearbox (torque splitting transmission) 220 and spur output pinions 234, 257 taken along the lines 3A-3A of FIG. 3

300B—perspective view of the motor shaft 299S, the sleeve 301, the pin 301P, and the sun, S, of the epicyclic gearbox (torque splitting transmission)

300C—elevation view of epicyclic gearbox (torque splitting transmission) 220 and spur output pinions, 257, 234

300D—perspective view of epicyclic gearbox (torque splitting transmission) 220 and spur output pinions 234, 257

300E—perspective view of epicyclic gearbox (torque splitting transmission) 220 and spur output pinions 234, 257 without end plate 257E shown

300F—perspective view of epicyclic gearbox (torque splitting transmission) 220 and spur output pinions 257, 234 without end plate, carrier, and planet gears

300G—perspective view of the small diameter ring gear 234R illustrating internal spline 282S which mates with the external spline 280S of connection plate 280

300H—perspective view of the first spur output pinion 257 including cylindrical portion 257C

300I—perspective view of end plate 257E of the epicyclic gearbox (torque splitting transmission) 220

300J—perspective view of the large ring gear 257R connected to end plate 257E

300K—perspective view of the large planet gear P1 and small planet gear P2

300L—perspective view of spur output pinion 234 interconnected with the connection plate 280 and the small ring gear 234R

300M—a cross-sectional view of the small diameter ring gear 234R, the connection plate 280, the spline 234S of end portion 234E of spur output pinion 234

300N—is a perspective view of spur output pinion 234 interconnected with connection plate 280

300O—is a perspective view of spur output pinion 234 and spline connection 234S

300P—is a perspective view of the connection plate 280 and the external spline 280S which mates with spline 282S of small ring gear 234R

301—sleeve driven by motor shaft 299S, sleeve 301 acts as a coupling driving pin 301P, pin 301P has external spline 303S which fits in sleeve 301 and mates with internal spline 301S

301P—pin with external spline 303S

301S—internal spline on sleeve 301

302S—internal spline on sun gear S

303S—external spline of pin 301P which mates with internal spline 302S on sun gear S $F_{r1}$=tangential force applied to first ring gear $F_{r2}$=tangential force applied to second ring gear $F_s$=tangential force applied to the sun gear $r_s$=pitch radius of sun gear $r_{P1}$=pitch radius of first planet, $P_1$ $r_{p2}$=pitch radius of second planet, $P_2$ $r_{r1}$=pitch radius of large ring gear 257R

$r_{r2}$=pitch radius of small ring gear 234R

$P_1$=large diameter planet gear which engages large diameter ring gear 257R

$P_2$=small diameter planet gear which engages small diameter ring gear 234R

S=sun gear

T=torque of sun gear $T_{r1}$=torque of first ring gear, 257R

$T_{r2}$=torque of second ring gear, 234R

⊙=direction of rotation into the page

⊗=direction of rotation out of the page

The invention has been set forth by way of example. Those skilled in the art will recognize that changes and modifications may be made to the examples set forth hereinabove without departing from the spirit and the scope of the attached claims.

The invention claimed is:

1. A dual output pinion rack drive, comprising:
  a rack, said rack includes a first side and a second side; said first side of said rack includes first teeth and said second side of said rack includes second teeth;
  a motor;
  an epicyclic gearbox; said epicyclic gearbox includes:
  a first spur output pinion, a large ring gear, and an end plate, said first spur output pinion, said large ring gear and said end plate affixed together and rotatable together;
  a second spur output pinion, a connection plate, and a small ring gear, said second spur output pinion, said connection plate, and said small ring gear affixed together and rotatable together;
  an input shaft driven by said motor;
  a sun gear affixed to said input shaft;
  a rotationally floating carrier;
  a first planet gear and a second planet gear, said first planet gear and said second planet gear being concentric with each other, said first planet gear and said second planet gear being integral with each other such that said first planet gear and said second planet gear are rotatable together;
a planet pin affixed to said floating carrier;
said first planet gear and said second planet gear rotatably mounted on said planet pin;
said first planet gear engages said large ring gear driving said large ring gear and said first spur output pinion in a first rotation direction;
said second planet gear engages said small ring gear driving said small ring gear and said second spur output pinion in a second rotation direction;
none of said floating carrier, said sun gear, said input shaft, said second spur output pinion, said large ring gear, said end plate, said first spur output pinion, said connection plate and said small ring gear being rotationally fixed, with respect to a stationary element;
said first spur output pinion drives a first compound intermediate gear set, said first compound intermediate gear set drives a first final output planetary gear system, said first final output planetary gear system includes a first final output planetary gear system carrier, and said first output planetary gear system carrier of said first planetary gear system drives a first rack driving output pinion, said first rack driving output pinion includes teeth, and, said teeth of said first rack driving output pinion engage said first teeth of said first side of said rack; and,
said second spur output pinion drives a second compound intermediate gear set, said second compound intermediate gear set drives a second final output planetary gear system, said second final output planetary gear system includes a second final output planetary gear system carrier, and said second output planetary gear system carrier of said second planetary gear system drives a second rack driving output pinion, said second rack driving output pinion includes teeth, and, said teeth of said second rack driving output pinion engage said second teeth of said second side of said rack.

2. A dual output pinion rack drive as claimed in claim 1, wherein said motor is bidirectional.

3. A dual output pinion rack drive mounted to a platform, comprising:
a rack, said rack includes a first side and a second side; said first side of said rack includes first teeth and said second side of said rack includes second teeth;
a motor;
an epicyclic gearbox; said epicyclic gearbox includes:
a first spur output pinion, a large ring gear, and an end plate, said first spur output pinion, said large ring gear and said end plate affixed together and rotatable together;
a second spur output pinion, a connection plate, and a small ring gear, said second spur output pinion, said connection plate, and said small ring gear affixed together and rotatable together;
an input shaft driven by said motor;
a sun gear affixed to said input shaft;
a rotationally floating carrier;
a first planet gear and a second planet gear, said first planet gear and said second planet gear being concentric with each other, said first planet gear and said second planet gear being integral with each other such that said first planet gear and said second planet gear are rotatable together;
a planet pin rotatably affixed to said floating carrier;
said first planet gear and said second planet gear rotatably mounted on said planet pin;
said first planet gear engages said large ring gear driving said large ring gear and said first spur output pinion in a first rotation direction;
said second planet gear engages said small ring gear driving said small ring gear and said second spur output pinion in a second rotation direction;
none of said floating carrier, said sun gear, said input shaft, said second spur output pinion, said large ring gear and said end plate, said first spur output pinion, said connection plate and said small ring gear being fixed rotationally, with respect to a stationary element;
said first spur output pinion drives a first compound intermediate gear set, said first compound intermediate gear set drives a first final output planetary gear system, said first final output planetary gear system includes a first final output planetary gear system carrier, and said first output planetary gear system carrier of said first planetary gear system drives a first rack driving output pinion, said first rack driving output pinion includes teeth, and, said teeth of said first rack driving output pinion engage said first teeth of said first side of said rack;
said second spur output pinion drives a second compound intermediate gear set, said second compound intermediate gear set drives a second final output planetary gear system, and, said second final output planetary gear system includes a second final output planetary gear system carrier, and said second output planetary gear system carrier of said second planetary gear system drives a second rack driving output pinion, said second rack driving output pinion includes teeth, and, said teeth of said second rack driving output pinion engage said second teeth of said second side of said rack.

4. A dual output pinion rack drive mounted to a platform as claimed in claim 3, wherein said motor is bidirectional.

5. A dual output pinion rack drive mounted to a platform, comprising:
a rack, said rack includes a first side and a second side; said first side of said rack includes first teeth and said second side of said rack includes second teeth;
a motor;
an epicyclic gearbox load sharing means;
said epicyclic gearbox load sharing means drives a first compound intermediate gear set, said first compound intermediate gear set drives a first final output planetary gear system, said first final output planetary gear system includes a first final output planetary gear system carrier, and said first output planetary gear system carrier of said first planetary gear system drives a first rack driving output pinion, said first rack driving output pinion includes teeth, and, said teeth of said first rack driving output pinion engage said first teeth of said first side of said rack;
said epicyclic gearbox load sharing means drives a second compound intermediate gear set, said second compound intermediate gear set drives a second final output planetary gear system, and, said second final output planetary gear system includes a second final output planetary gear system carrier, and said second output planetary gear system carrier of said second planetary gear system drives a second rack driving output pinion, said second rack driving output pinion includes teeth, and, said teeth of said second rack driving output pinion engage said second teeth of said second side of said rack; and, said epicyclic gearbox load sharing means permits the division of power of said motor to said first rack driving output pinion and said second rack driving output pinion, and wherein load sharing occurs between said first rack driving output pinion and second rack driving output pinion such that said first rack driving output pinion and said second rack driving output pinion are always in mesh with said first teeth of said first side of said rack and said second teeth of said second side of said rack, respectively.

6. A dual output pinion rack drive mounted to a platform as claimed in claim 5 wherein said epicyclic gearbox load sharing means includes:
   a first spur output pinion, a large ring gear, and an end plate, said first spur output pinion, said large ring gear and said end plate affixed together and rotatable together;
   a second spur output pinion, a connection plate, and a small ring gear, said second spur output pinion, said connection plate, and said small ring gear affixed together and rotatable together;
   an input shaft driven by said motor;
   a sun gear affixed to said input shaft;
   a floating carrier;
   a first planet gear and a second planet gear, said first planet gear and said second planet gear being concentric with each other, said first planet gear and said second planet gear being integral with each other such that said first planet gear and said second planet gear are rotatable together;
   a planet pin affixed to said floating carrier; said first planet gear and said second planet gear rotatably mounted on said planet pin;
   said first planet gear engages said large ring gear driving said large ring gear and said first spur output pinion in a first rotation direction;
   said second planet gear engages said small ring gear driving said small ring gear and said second spur output pinion in a second rotation direction; and,
   none of said floating carrier, said sun gear, said input shaft, said second spur output pinion, said large ring gear and said end plate, said first spur output pinion, said connection plate and said small ring gear being rotationally fixed, with respect to a stationary element.

7. A dual output pinion rack drive mounted to a platform, comprising
   a rack, said rack includes a first side and a second side; said first side of said rack includes first teeth and said second side of said rack includes second teeth;
   a motor;
   an epicyclic gearbox load sharing means;
   said motor drives said epicyclic gearbox load sharing means;
   and,
   a first rack driving output pinion and a second rack driving output pinion, and, said first rack driving output pinion and said second rack driving output pinion are driven by said epicyclic gearbox load sharing means
   wherein said epicyclic gearbox load sharing means includes:
   a first spur output pinion, a large ring gear, and an end plate, said first spur output pinion, said large ring gear and said end plate affixed together and rotatable together;
   a second spur output pinion, a connection plate, and a small ring gear, said second spur output pinion, said connection plate, and said small ring gear affixed together and rotatable together;
   an input shaft driven by said motor;
   a sun gear affixed to said input shaft;
   a floating carrier;
   a first planet gear and a second planet gear, said first planet gear and said second planet gear being concentric with each other, said first planet gear and said second planet gear being integral with each other such that said first planet gear and said second planet gear are rotatable together;
   a planet pin is affixed to said floating carrier;
   said first planet gear and said second planet gear rotatably mounted on said planet pin;
   said first planet gear engages said large ring gear driving said large ring gear and said first spur output pinion in a first rotation direction;
   said second planet gear engages said small ring gear driving said small ring gear and said second spur output pinion in a second rotation direction; and,
   none of said floating carrier, said sun gear, said input shaft, said second spur output pinion, said large ring gear and said end plate, said first spur output pinion, said connection plate and said small ring gear rotationally fixed, with respect to a stationary element.

8. A dual output pinion rack drive mounted to a platform, comprising
   a rack, said rack includes a first side and a second side; said first side of said rack includes first teeth and said second side of said rack includes second teeth;
   a motor;
   an epicyclic gearbox load sharing means;
   said motor drives said epicyclic gearbox load sharing means;
   and,
   a first rack driving output pinion and a second rack driving output pinion, and, said first rack driving output pinion and said second rack driving output pinion are driven by said epicyclic gearbox load sharing means wherein
   said epicyclic gearbox load sharing means drives a first compound intermediate gear set, said first compound intermediate gear set drives a first final output planetary gear system, said first final output planetary gear system includes a first final output planetary gear system carrier, and said first output planetary gear system carrier of said first planetary gear system drives said first rack driving output pinion, said first rack driving output pinion includes teeth, and, said teeth of said first rack driving output pinion engage said first teeth of said first side of said rack;
   said epicyclic gearbox load sharing driving means drives a second compound intermediate gear set, said second compound intermediate gear set drives a second final output planetary gear system, and, said second final output planetary gear system includes a second final output planetary gear system carrier, and said second output planetary gear system carrier of said second planetary gear system drives said second rack driving output pinion, said second rack driving output pinion includes teeth, and, said teeth of said second rack driving output pinion engage said second teeth of said second side of said rack; and, said epicyclic gearbox load sharing means permits the division of power of said motor to said first rack driving output pinion and said second rack driving output pinion, and wherein load sharing occurs between said first rack driving output pinion and second rack driving output pinion such that said first rack driving output pinion and said second rack driving output pinion are thus always in mesh with said first teeth of said first side of said rack and said second teeth of said second side of said rack, respectively.

9. A dual output pinion rack drive mounted to a platform, comprising
   a rack, said rack includes a first side and a second side;
   said first side of said rack includes first teeth and said second side of said rack includes second teeth;
   a motor;
   a gearbox load sharing means;
   said motor drives said gearbox load sharing means; and,
   a first rack driving output pinion and a second rack driving output pinion, and, said first rack driving output pinion and said second rack driving output pinion are driven by said gearbox load sharing means
   wherein said epicyclic gearbox load sharing means includes:
      a first spur output pinion, a large ring gear, and an end plate, said first spur output pinion, said large ring gear and said end plate affixed together and rotatable together;
      a second spur output pinion, a connection plate, and a small ring gear, said second spur output pinion, said connection plate, and said small ring gear affixed together and rotatable together;
      an input shaft driven by said motor;
      a sun gear affixed to said input shaft;
      a floating carrier;
      a first planet gear and a second planet gear, said first planet gear and said second planet gear being concentric with each other, said first planet gear and said second planet gear being integral with each other such that said first planet gear and said second planet gear are rotatable together;
      a planet pin is affixed to said floating carrier;
      said first planet gear and said second planet gear rotatably mounted on said planet pin;
      said first planet gear engages said large ring gear driving said large ring gear and said first spur output pinion in a first rotation direction;
      said second planet gear engages said small ring gear driving said small ring gear and said second spur output pinion in a second rotation direction; and,
      none of said floating carrier, said sun gear, said input shaft, said second spur output pinion, said large ring gear and said end plate, said first spur output pinion, said connection plate and said small ring gear being rotationally fixed, with respect to a stationary element.

10. A dual output pinion rack drive mounted to a platform comprising
    a rack, said rack includes a first side and a second side;
    said first side of said rack includes first teeth and said second side of said rack includes second teeth;
    a motor;
    a gearbox load sharing means;
    said motor drives said gearbox load sharing means; and,
    a first rack driving output pinion and a second rack driving output pinion, and, said first rack driving output pinion and said second rack driving output pinion are driven by said gearbox load sharing means
    said gearbox load sharing means drives a first compound intermediate gear set, said first compound intermediate gear set drives a first final output planetary gear system, said first final output planetary gear system includes a first final output planetary gear system carrier, and said first output planetary gear system carrier of said first planetary gear system drives said first rack driving output pinion, said first rack driving output pinion includes teeth, and, said teeth of said first rack driving output pinion engage said first teeth of said first side of said rack;
    said gearbox load sharing driving means drives a second compound intermediate gear set, said second compound intermediate gear set drives a second final output planetary gear system, and, said second final output planetary gear system includes a second final output planetary gear system carrier, and said second output planetary gear system carrier of said second planetary gear system drives said second rack driving output pinion, said second rack driving output pinion includes teeth, and, said teeth of said second rack driving output pinion engage said second teeth of said second side of said rack; and,
    said gearbox load sharing means permits the division of power of said motor to said first rack driving output pinion and said second rack driving output pinion,
    and wherein load sharing occurs between said first rack driving output pinion and second rack driving output pinion such that said first rack driving output pinion and said second rack driving output pinion are thus always in mesh with said first teeth of said first side of said rack and said second teeth of said second side of said rack, respectively.

* * * * *